(12) United States Patent
Kumar et al.

(10) Patent No.: US 11,982,248 B2
(45) Date of Patent: May 14, 2024

(54) METHODS AND SYSTEMS FOR DIAGNOSING ENGINE CYLINDERS

(71) Applicant: Transportation IP Holdings, LLC, Norwalk, CT (US)

(72) Inventors: Prashant Kumar, Bengaluru (IN); David Schroeck, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 17/452,209

(22) Filed: Oct. 25, 2021

(65) Prior Publication Data

US 2023/0126002 A1 Apr. 27, 2023

(51) Int. Cl.
| | |
|---|---|
| F02D 41/22 | (2006.01) |
| F02D 41/00 | (2006.01) |
| F02D 41/14 | (2006.01) |
| F02D 41/30 | (2006.01) |
| G01M 15/12 | (2006.01) |

(52) U.S. Cl.
CPC ......... *F02D 41/22* (2013.01); *F02D 41/0087* (2013.01); *F02D 41/1446* (2013.01); *F02D 41/1498* (2013.01); *F02D 41/3076* (2013.01); *G01M 15/12* (2013.01); *F02D 2200/101* (2013.01)

(58) Field of Classification Search
CPC .. F02D 41/1446; F02D 41/221; F02D 35/026; F02D 35/025; F02D 41/126; F02D 41/0087; F02D 41/024; F02D 41/025; F02D 41/0255; F02D 41/1401; G01M 15/12; G01M 15/11; G01L 23/223; B01J 38/58

USPC ............. 701/107, 111, 114; 73/114.07
See application file for complete search history.

(56) References Cited

U.S. PATENT DOCUMENTS

| | | | | | |
|---|---|---|---|---|---|
| 3,783,681 | A | * | 1/1974 | Hirt .................... | F02D 17/04 73/590 |
| 4,483,180 | A | * | 11/1984 | Ohbuchi .............. | G01L 23/222 73/35.11 |
| 4,562,813 | A | * | 1/1986 | Okado ................. | G01L 23/222 73/35.11 |
| 4,683,856 | A | * | 8/1987 | Matsuura ............. | B65B 51/30 123/436 |
| 4,771,637 | A | * | 9/1988 | Kubler ................. | G01H 1/00 73/651 |
| 4,841,933 | A | * | 6/1989 | McHale ............... | F02D 41/0087 123/406.24 |
| 4,896,639 | A | * | 1/1990 | Holmes ................ | F02D 35/027 123/436 |
| 4,971,010 | A | * | 11/1990 | Iwata .................... | F02D 41/22 123/481 |
| 5,005,549 | A | * | 4/1991 | Pernpeintner ....... | F02D 41/0087 123/406.27 |

(Continued)

*Primary Examiner* — Sizo B Vilakazi
*Assistant Examiner* — Brian R Kirby
(74) *Attorney, Agent, or Firm* — McCoy Russell LLP

(57) ABSTRACT

Systems and methods are provided for diagnosing cylinders in an engine. In one example, the method may include while receiving first feedback from a vibration sensor coupled to a first cylinder of the engine, perturbing the first cylinder during engine operation. Responsive to the first feedback indicating a first vibration level difference greater than or equal to a first threshold difference, a first indication of a first degradation condition of the first cylinder may be set, and thereafter the engine may be operated based on whether or not the first indication was set.

19 Claims, 9 Drawing Sheets

(56) References Cited

U.S. PATENT DOCUMENTS

| | | | | |
|---|---|---|---|---|
| 5,044,337 A * | 9/1991 | Williams | F02D 41/1466 | 123/436 |
| 5,392,642 A * | 2/1995 | Tao | G01M 15/12 | 73/114.13 |
| 5,497,751 A * | 3/1996 | Ohtake | F02D 41/266 | 123/479 |
| 5,528,930 A * | 6/1996 | Park | G01M 15/09 | 73/114.06 |
| 5,566,091 A * | 10/1996 | Schricker | G01M 15/048 | 340/439 |
| 5,646,340 A * | 7/1997 | Gee | G01P 3/48 | 73/114.25 |
| 5,864,055 A * | 1/1999 | Borrione | F02D 41/221 | 73/35.03 |
| 5,905,193 A * | 5/1999 | Hashizume | G01L 23/225 | 701/111 |
| 5,934,256 A * | 8/1999 | Wenzlawski | F02D 35/027 | 123/481 |
| 5,983,876 A * | 11/1999 | Irons | F02D 41/1497 | 123/478 |
| 6,092,016 A * | 7/2000 | Sarangapani | F02D 41/222 | 123/676 |
| 6,192,855 B1 * | 2/2001 | Schietecatte | F02D 41/403 | 123/299 |
| 6,212,944 B1 * | 4/2001 | Kwun | G01L 23/223 | 73/DIG. 2 |
| 6,273,064 B1 * | 8/2001 | Scholl | G01L 23/222 | 123/406.24 |
| 6,332,446 B1 * | 12/2001 | Matsumoto | F02D 41/0087 | 123/90.11 |
| 6,388,444 B1 * | 5/2002 | Hahn | G01M 15/11 | 123/406.24 |
| 6,510,731 B2 * | 1/2003 | Schricker | G01M 15/044 | 73/114.42 |
| 6,598,479 B1 * | 7/2003 | Robinson | G01H 11/06 | 73/658 |
| 6,675,639 B1 * | 1/2004 | Schricker | G01M 15/102 | 73/114.01 |
| 7,027,909 B2 * | 4/2006 | deBotton | G01M 15/12 | 701/111 |
| 7,403,850 B1 * | 7/2008 | Boutin | G01M 15/05 | 701/107 |
| 8,099,231 B1 * | 1/2012 | Suwa | F02D 41/403 | 701/111 |
| 9,014,918 B2 * | 4/2015 | Hagen | G07C 5/006 | 701/32.4 |
| 9,752,949 B2 * | 9/2017 | Bizub | F02D 35/027 | |
| 9,791,343 B2 * | 10/2017 | Bizub | G01M 15/12 | |
| 9,915,217 B2 * | 3/2018 | Bizub | F02D 41/2438 | |
| 9,951,703 B2 * | 4/2018 | Pathan | B61C 17/00 | |
| 10,837,376 B2 * | 11/2020 | Pathan | F02D 41/28 | |
| 2003/0079528 A1 * | 5/2003 | Wittliff | G01M 15/044 | 73/114.11 |
| 2004/0118182 A1 * | 6/2004 | Glowczewski | G01M 15/08 | 73/35.09 |
| 2007/0033997 A1 * | 2/2007 | Schueler | F02D 41/222 | 73/35.07 |
| 2007/0131203 A1 * | 6/2007 | Ohga | F02D 41/1467 | 701/104 |
| 2008/0035108 A1 * | 2/2008 | Ancimer | G01L 23/221 | 123/406.21 |
| 2011/0139118 A1 * | 6/2011 | Glugla | G01M 15/12 | 123/436 |
| 2016/0146125 A1 * | 5/2016 | Jung | F02D 41/403 | 123/478 |
| 2016/0333807 A1 * | 11/2016 | Pathan | G01M 15/11 | |
| 2016/0377506 A1 * | 12/2016 | Bizub | G01M 15/14 | 702/35 |
| 2017/0067406 A1 * | 3/2017 | Jung | F02D 35/023 | |
| 2017/0306915 A1 * | 10/2017 | Karunaratne | F02D 41/221 | |
| 2017/0350333 A1 * | 12/2017 | Glugla | F02D 35/0015 | |
| 2018/0209363 A1 * | 7/2018 | Suzuki | F02D 41/1454 | |
| 2019/0162158 A1 * | 5/2019 | Zurlo | F02D 41/1497 | |
| 2019/0383705 A1 * | 12/2019 | Smart | G01H 1/00 | |
| 2021/0381458 A1 * | 12/2021 | Lee | F02D 41/1498 | |

* cited by examiner

METHODS AND SYSTEMS FOR DIAGNOSING ENGINE CYLINDERS

BACKGROUND

Technical Field

Embodiments of the subject matter disclosed herein relate to methods and systems for diagnosing cylinders in an engine.

Discussion of Art

Vehicles, such as rail vehicles, include power sources, such as diesel internal combustion engines. One or more degraded cylinders may contribute to power loss in an engine. In some examples, degraded cylinder performance may result from other degraded components (e.g., a fuel injector or fuel pump, power assembly, and/or valve train), internal water leaks, water in oil, etc. Some diagnostic strategies for evaluating cylinder performance may include a pop test, which diagnoses fuel injection performance one cylinder at a time during a fueling disturbance, and permanently installed knock sensors (e.g., where the sensors are present throughout a lifetime of the engine), which may monitor engine performance during typical operation. The performance of a diagnostic strategy may be impacted by its precision, reliability, ease of implementation, cost, and/or other factors. It may be desirable to have methods and systems for diagnosing degraded cylinders that differ in function from those that are currently available. The above issues are not admitted to be recognized in the state of the art.

BRIEF DESCRIPTION

In one embodiment, a method for an engine may include while receiving first feedback from a vibration sensor coupled to a first cylinder of the engine, perturbing the first cylinder during engine operation; responsive to the first feedback indicating a first vibration level difference greater than or equal to a first threshold difference, setting a first indication of a first degradation condition of the first cylinder; and thereafter operating the engine based on whether or not the first indication was set.

DETAILED DESCRIPTION

Figure 1:
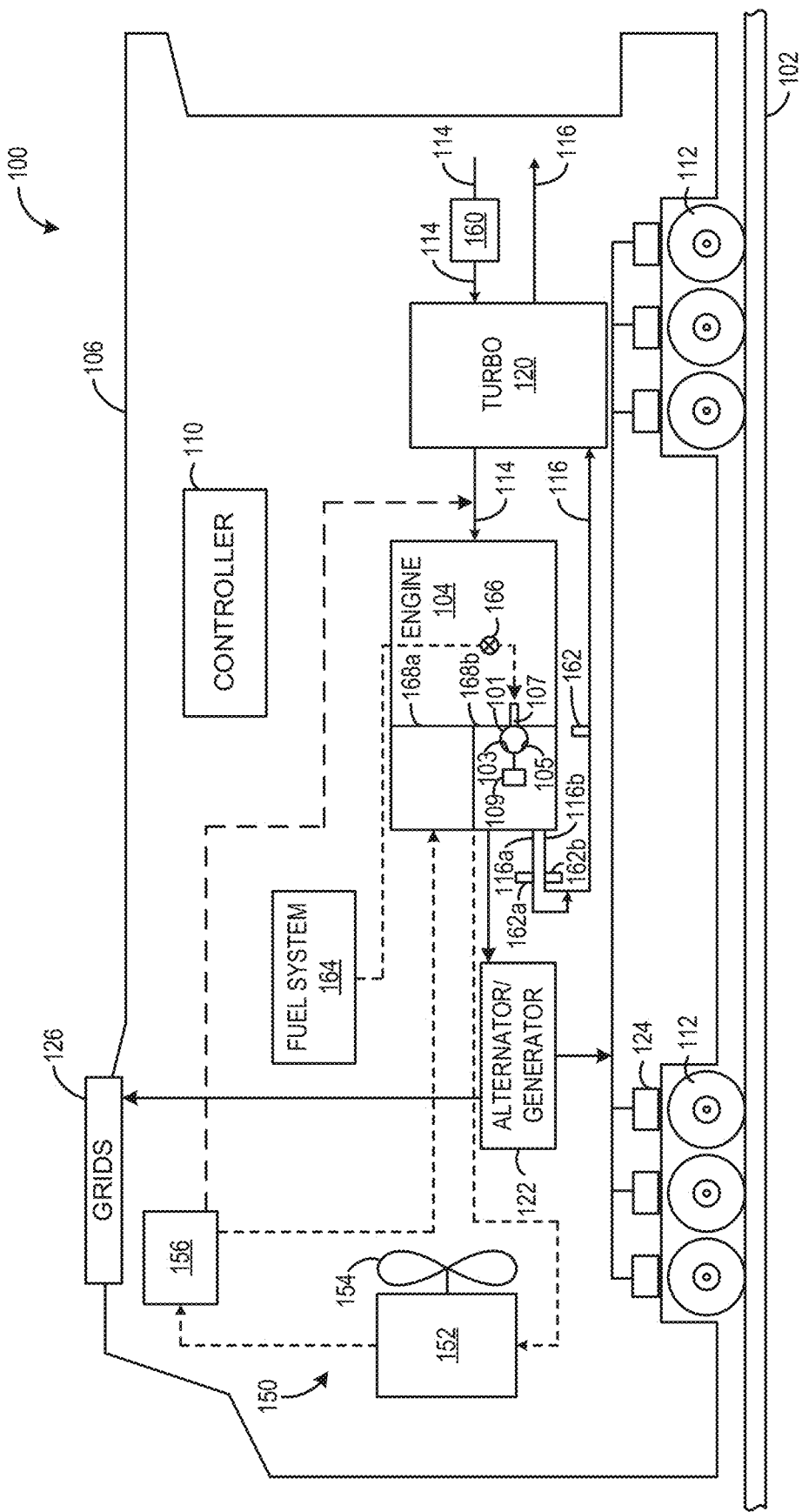
FIG. 1 shows a schematic diagram of a vehicle with an engine, according to an embodiment of the present disclosure.

Embodiments of the invention are disclosed in the following description, and may relate to systems and methods for diagnosing one or more degraded cylinders in an internal combustion engine system. Such an engine system may be positioned in a vehicle system. Aspects of the invention may reduce service time and repair costs associated with diagnosing cylinders.

In examples where a cylinder condition may contribute to engine system performance decline, limited solutions exist for diagnosing degraded or otherwise anomalous cylinders causing the cylinder condition, especially for non-severely degraded cylinders, in an efficient and cost effective manner. Strategies for identifying anomalous cylinders in a multi-cylinder engine include a pop test, which may diagnose fuel injection performance a single cylinder at a time based on a technician hearing or not hearing audible popping noise upon cylinder by cylinder over fueling, and/or permanent (e.g., welded or otherwise permanently affixed or irremovably integrated) installation of engine system sensors (e.g., knock sensors), which can monitor engine performance during operation. However, in some examples, the pop test may be influenced by technician subjectivity. Further, in some examples, though knock sensors may monitor engine power loss, calibration may affect identification of individual components contributing to a degraded condition. In examples where diagnostics are reliant on significant technical specialization, complicated calibration, lack of precision, misdirected repairs, delayed service time, and increased costs may result. Methods and systems for diagnosing cylinders based on differences in cylinder vibration and/or pre-turbine exhaust gas temperature may mitigate some of the aforementioned challenges.

A technical effect of diagnosing cylinders based on differences in cylinder vibration and/or pre-turbine exhaust gas temperature is that anomalous engine performance may be characterized with greater accuracy and sensitivity. In some examples, earlier and more accurate/precise/detailed diagnoses of engine power loss may allow technicians to identify and address degraded components before more costly and labor-intensive degradation modes progress. In one embodiment, one or more target cylinders may be selected for one or more diagnostic tests. A diagnostic test may include coupling (e.g., mounting to a cylinder head) a vibration sensor (e.g., knock sensor, accelerometer, gyroscope, etc.) to a first cylinder, and monitoring a vibration level with the vibration sensor during perturbation (e.g., fuel cut out) to the first cylinder during engine operation. A difference in vibration levels at the first cylinder caused by the perturbation may indicate a first degradation condition. The vibration sensor may be decoupled (e.g., dismounted, detached, removed, etc.) from the first cylinder and the diagnostic test may be repeated for each remaining cylinder of the one or more target cylinders. In an exemplary embodiment, one or more degraded cylinders may be identified by the anomalous vibration level relative to vibration levels of remaining target cylinders. In an additional or alternative embodiment, severity of degradation and/or confidence in degradation may be indicated for one or more target cylinders by measuring a vibration level difference at the first cylinder while perturbing (e.g., cutting fuel to) a second cylinder during engine operation.

In a further embodiment, the vibration sensor may be coupled to a first cylinder, and the engine may be set to full throttle. As the engine sweeps to a rated speed, a first vibration level may be received. A second cylinder may be selected to test, for which a second vibration level may be received. The difference in vibrations between the first and second cylinders may be compared to a threshold difference indicative of a cylinder condition. In one example, non-anomalous cylinders may produce speed sweep vibration levels in one range and anomalous cylinders may produce different speed sweep vibration levels, e.g., in another range.

In an additional embodiment, a diagnostic test may include selecting a target cylinder set of an engine system having more than one cylinder bank, cutting fuel to the target cylinder set, and measuring a pre-turbine exhaust gas temperature at each cylinder bank of the system. The difference between the pre-turbine exhaust gas temperatures at each of the more than one cylinder banks may be compared to a threshold pre-turbine exhaust gas temperature difference indicative of a cylinder condition.

In an exemplary embodiment, the difference between vibration and/or temperature measurements obtained for target cylinders and/or cylinder sets during the aforementioned diagnostic procedures may allow identification of anomalous performance relative to the plurality of tested cylinders using tools typical to a service setting and without complicated calibration.

FIG. 1 shows an embodiment of a vehicle system powered by an engine including a plurality of cylinders. Specifically, FIG. 1 shows a block diagram of an embodiment of a vehicle system 100. In the illustrated example, an engine 104 (e.g., an internal combustion engine, such as a high-speed diesel engine) is coupled to a vehicle, which is depicted as a rail vehicle 106 (e.g., locomotive). The vehicle can run on a rail 102 via a plurality of wheels 112. As depicted, the vehicle may include the engine 104. The engine may include a plurality of cylinders 101 (only one representative cylinder shown in FIG. 1) arranged in a first cylinder bank 168a and a second cylinder bank 168b. In one embodiment, the plurality of cylinders may include a target cylinder at which adjustments to fuel and other perturbations may be made and vibration levels or other operating conditions may be read. In another embodiment, the plurality of cylinders may include a perturbation cylinder at which adjustments to fuel and other perturbations may be made, during which one or more operating conditions may be monitored at another (e.g., target) cylinders. Each cylinder may include at least one intake valve 103, an exhaust valve 105, and a fuel injector 107. Each intake valve 103, exhaust valve 105, and fuel injector 107 may include an actuator that may be actuated via a signal from a controller 110 of the engine. In other non-limiting embodiments, the engine may be in a stationary platform. Suitable stationary platforms may include a power-plant application. Other suitable vehicles may include a marine vessel, mining or industrial equipment, on-road vehicles, and off-highway vehicle propulsion systems.

The engine may receive intake air for combustion from an intake passage 114. The intake passage 114 may include an air filter 160 that filters air from outside of the vehicle. In one embodiment, the plurality of cylinders may be arranged in at least a first cylinder bank and a second cylinder bank (not shown). Exhaust gas resulting from combustion in the engine at each of the first and second cylinder banks may be supplied to a first exhaust passage 116a and a second exhaust passage 116b, respectively. Exhaust gas may flow through the first and second exhaust passages to a third, combined exhaust passage 116, and out of an exhaust stack of the rail vehicle. The first and second exhaust passages may respectively include a first exhaust gas sensor 162a and a second exhaust gas sensor 162b, which may monitor a temperature and/or an air-fuel ratio of the exhaust gas, and which may be coupled to the controller to provide monitoring data thereto.

The engine system may include a fuel system 164 fluidically coupled to each of the plurality of cylinders. The controller may be communicably coupled to the fuel system. The fuel system may include a plurality of valves 166 respectively controlling fueling for the plurality of cylinders, each valve of the plurality of valves adjustable among a continuously variable set of positions. For example, a given valve may take on open, partially open, and closed positions. Fuel may flow through the valve when the valve is open or partially open. Fuel may not flow through the valve when the valve is closed. In one example, the engine may be a diesel engine that combusts air and diesel fuel through compression ignition. In another example, the engine may be a dual or multi-fuel engine that may combust a mixture of gaseous fuel and air upon injection of diesel fuel during compression of the air-gaseous fuel mixture. In other non-limiting embodiments, the engine may additionally combust fuel including gasoline, kerosene, natural gas, biodiesel, or other petroleum distillates of similar density through compression ignition (and/or spark ignition).

A suitable rail vehicle may be a diesel-electric locomotive. Suitable diesel-electric locomotives may include main-line haulers, heavy haul freight haulers, passenger rail vehicles, shunters, switchers, and the like. The diesel-electric locomotive may include other power sources, such as hybrid electric (batteries), fuel cells, hydrogen engines, and the like. While diesel is used as an example fuel, other fuels may be used. Suitable other fuels may include gasoline, kerosene, ethanol, biodiesel, natural gas, and combinations of the foregoing. As depicted in FIG. 1, the engine may be coupled to an electric power generation system, which includes an alternator/generator 122 and a plurality of electric traction motors 124. For example, the engine may be a diesel and/or natural gas engine that generates a torque output, which may be transmitted to the alternator/generator, the alternator/generator being mechanically coupled to the engine. In one embodiment herein, the engine may be a multi-fuel engine operating with diesel fuel and natural gas.

Electrical power produced by the alternator/generator may be stored and applied for subsequent propagation to a variety of downstream electrical components. As an example, the alternator/generator may be electrically coupled to the plurality of electric traction motors and the alternator/generator may provide electrical power to the plurality of electric traction motors. As depicted, each of the plurality of electric traction motors may be coupled to one of the plurality of wheels to provide tractive power to propel the rail vehicle. One example configuration may include one electric traction motor per wheel set (e.g., a subset of the plurality of wheels). As depicted herein, six electric traction motors may correspond to each of six pairs of motive wheels of the rail vehicle. In another example, the alternator/generator may be coupled to one or more resistive grids 126. The resistive grids may dissipate excess engine torque via heat produced by the grids from electricity generated by the alternator/generator. Additionally or alternatively, the resistive grids may be used in dynamic braking mode to dissipate electricity generated by the traction motors.

In some embodiments, the vehicle system may include a turbocharger 120 arranged between the intake passage 114 and the exhaust passage 116. The turbocharger may increase air charge of ambient air drawn into the intake passage to provide greater charge density during combustion to increase power output and/or engine-operating efficiency. The turbocharger may include at least one compressor (not shown) which may be at least partially driven by at least one corresponding turbine (not shown). In some embodiments, the vehicle system may include an aftertreatment system coupled in the exhaust passage upstream and/or downstream of the turbocharger. In one embodiment, the aftertreatment system may include a diesel oxidation catalyst (DOC) and/or a diesel particulate filter (DPF). In other embodiments, the aftertreatment system may additionally or alternatively include one or more emission control devices. Such emission control devices may include a selective catalytic reduction (SCR) catalyst, three-way catalyst, NOx trap, or various other devices or exhaust aftertreatment systems.

As depicted in FIG. 1, the vehicle system may include a thermal management system 150 (e.g., engine cooling system). The cooling system may circulate coolant (e.g., water, glycol, etc.) through the engine to absorb waste engine heat and distribute the heated coolant to a heat exchanger, such as a radiator 152 (e.g., radiator heat exchanger). A suitable coolant may be water. A fan 154 may be coupled to the radiator to maintain an airflow through the radiator when the vehicle is moving slowly or stopped while the engine is running. In some examples, a speed of the fan may be controlled by the controller. Coolant, which is cooled by the radiator, may enter a tank (not shown). The coolant may then be pumped by a water, or coolant, pump 156 back to the engine or to another component of the vehicle system.

The controller may control various components related to the vehicle. As an example, various components of the vehicle system may be coupled to the controller via a communication channel or data bus. In one example, the controller may include a computer control system. The controller may additionally or alternatively include a memory holding non-transitory computer readable storage media (not shown) including code for enabling on-board monitoring and control of rail vehicle operation. In some examples, the controller may include more than one controller each in communication with one another, such as a first controller to control the engine and a second controller to control other operating parameters of the rail vehicle (such as tractive motor load, blower speed, etc.). The first controller may control various actuators based on output received from the second controller and/or the second controller may control various actuators based on output received from the first controller.

The controller may receive information from a plurality of sensors and may send control signals to a plurality of actuators. The controller, while overseeing control and management of the engine and/or the rail vehicle, may be configured to receive signals from a variety of engine sensors, as further elaborated herein, in order to determine operating parameters and operating conditions, and correspondingly adjust various engine actuators to control operation of the engine and/or the rail vehicle. For example, the controller may receive signals from various engine sensors including, but not limited to, engine speed, engine load, intake manifold air pressure, boost pressure, exhaust pressure, ambient pressure, ambient temperature, exhaust gas temperature, exhaust gas air-fuel ratio, particulate filter temperature, particulate filter backpressure, engine coolant pressure, or the like.

In an exemplary embodiment, the controller may receive signals from a vibration sensor 109, e.g., knock sensor, accelerometer, or gyroscope, externally mounted or otherwise coupled to the cylinder. For example, there may be one vibration sensor for a single target cylinder which is removably mounted to the exterior of the cylinder head (e.g., magnetized, attached via one or more mechanical fasteners, adhered via a mild adhesive, or otherwise removable by hand) so that it may be placed on any other target cylinder. In an example, the vibration sensor may be coupled to the cylinder head using an adherent that falls within a lower and upper threshold adhesiveness, e.g., 3.0-9.0 N/cm as measured by a 180° peel adhesion test. In an exemplary embodiment, mounting of the vibration sensor may be configured so as to maintain the structural integrity of the vibration sensor and the target cylinder upon dismounting from the cylinder head. For example, removal of the vibration sensor may maintain a functionality thereof and does not compromise the composition, assembly, or monolithic construction of components of the cylinder and/or the sensor (e.g., structural strength, durability, etc.). Accordingly, in one example, the vibration sensor may not be welded to the cylinder head or to any other component of the engine. In certain examples, multiple removable vibration sensors may be included for simultaneously measuring vibration levels at different target cylinders. In other embodiments, there may be a permanently affixed (e.g., welded or otherwise removable via application of excessive force) vibration sensor mounted on the single target cylinder or on each cylinder or each cylinder bank. In some examples, the vibration sensor may be in communication with the controller transiently, e.g., only for the duration of a diagnostic test.

Though certain embodiments of the methods described herein may include the use of one or more permanently coupled vibration sensors, there may be advantages to the use of transiently coupled sensors. One advantage may include minimizing wear-induced degradation of vibration sensor components, e.g., from heat, grease, or dirt, and therefore minimizing cost associated with replacing degraded sensors. Another advantage may include reduced cost in the manufacture of the engine components, e.g., by avoiding the need to manufacture cylinders with permanently mounted vibration sensors. Additionally, physical access to cylinders and engine components may not be blocked or otherwise complicated by one or more permanently mounted vibration sensors, which may be an advantage during engine service.

Additional sensors, such as coolant temperature sensors, may be positioned in the cooling system. Correspondingly, the controller may control the engine and/or the rail vehicle by sending commands to various components such as the plurality of electric traction motors, the alternator/generator, the fuel injectors, valves, the coolant pump, or the like. For example, the controller may control the operation of a restrictive element (e.g., such as a valve) to admit or cut fuel from the fuel system to a given cylinder of the engine. Other actuators controllable by the controller may be coupled to various locations in the rail vehicle.

Figure 2:
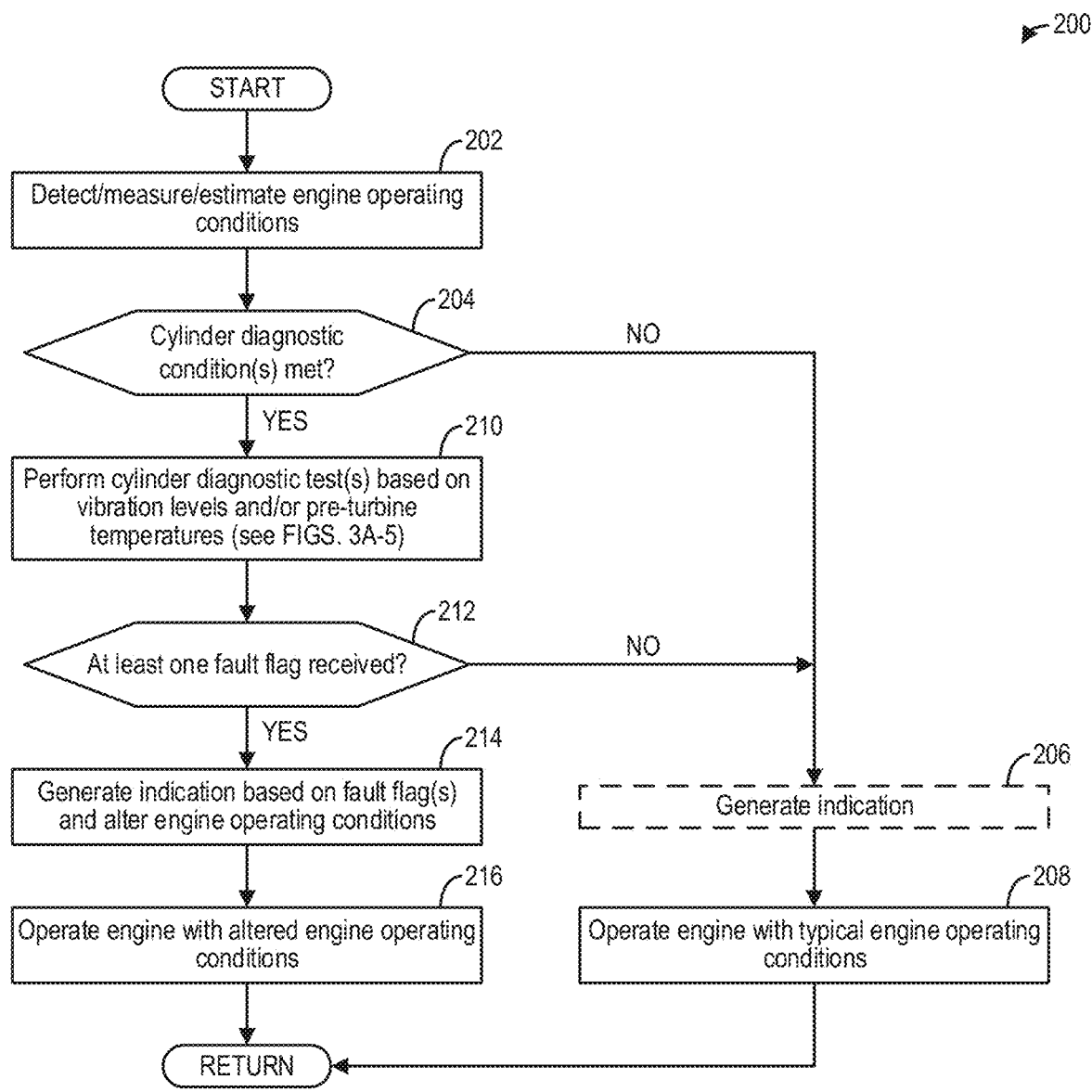
FIG. 2 shows a flow chart of a method for diagnosing one or more cylinders of a plurality of cylinders in an engine, according to an embodiment of the present disclosure.

Referring now to FIG. 2, a flow chart is depicted, showing a method 200 for diagnosing one or more cylinders in an engine. In an exemplary embodiment, the method 200 may base diagnosis of the one or more cylinders on a flag received from the methods described in detail below with reference FIGS. 3A-5 and may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below. The methods described herein may be operated with the engine running.

The method of FIG. 2 may begin at step 202, where engine operating conditions may be detected, measured, and/or estimated. Engine operating conditions may include one or more of engine speed, engine load, engine temperature, ambient conditions (e.g., ambient temperature, pressure, humidity, etc.), current operator torque demand, exhaust gas temperature (e.g., pre-turbine and/or post-turbine), manifold pressure, crankcase pressure, manifold airflow, fuel temperature, vibration levels, etc. The engine operating conditions may be measured by one or more sensors communicatively coupled to the controller (e.g., pre-turbine exhaust gas temperature measured by an exhaust gas temperature sensor positioned in an exhaust passage upstream of a turbine) or may be inferred based on available data (e.g., the engine temperature may be estimated from an engine coolant temperature measured by an engine coolant temperature sensor).

The method may continue to step 204, where it is determined whether one or more cylinder diagnostic conditions are met. The one or more cylinder diagnostic conditions may be stored on the controller of the system, and may each include an upper threshold and a lower threshold that describe engine operating conditions (e.g., throttle level or "notch", engine speed, engine load, engine airflow, manifold pressure, vibration level, etc.). In an exemplary embodiment, a cylinder diagnostic condition may include maintaining the engine at a steady state corresponding to a mid- or high-range engine power output, e.g., 50-60% of steady state engine load and speed or higher based on engine testing. In another embodiment, a cylinder diagnostic condition may include the engine cranked and stabilized at idle, e.g., less than 10% of steady state engine load and speed based on engine testing. In an exemplary embodiment, a cylinder diagnostic condition may include setting a high-load throttle level, e.g., greater than or equal to 50% of rated engine load. In some examples, increasing engine power increases vibration, such that there may be a dependency of a strength of various vibration signals received at the controller on the engine power. In some examples, the methods described herein with the engine running at higher power may enable detection of a wider range of signal variations by avoiding the less calibrated/balanced dynamics common to low power engine conditions. In an additional embodiment, a cylinder diagnostic condition may include the controller receiving a request to initiate a cylinder diagnostic (e.g., from a technician or based on a predetermined cycle). The one or more cylinder diagnostic conditions may include any combination of one or more of the preceding cylinder diagnostic conditions and/or other parameters or conditions not expressly described herein.

In response to the engine operating without the cylinder diagnostic conditions met, the method may proceed to step 206, where the controller may generate an indication, such as an indication of inability to meet the one or more cylinder diagnostic conditions. In an example, an inability to meet the thresholds for various engine parameters may produce an inconclusive result and thus the cylinder diagnostic may not be initiated. In an example, the engine may not generate enough horsepower to meet the one or more cylinder diagnostic conditions, and therefore a general diagnostic strategy may be more appropriate. In another example, a substantial decrease in horsepower output outside a threshold horsepower output may indicate a system-wide anomaly, such as an alternator malfunction, which may be specified in the indication. In some embodiments, no indication may be generated at step 206, and an absence of the indication may be inferred (e.g., by a technician or a vehicle operator) as the inability to meet the one or more cylinder diagnostic conditions. Accordingly, in FIG. 2, step 206 is indicated in dashing, as generating the indication may be optional. Additionally or alternatively, if the one or more cylinder diagnostic conditions are not met or following generation of the indication, the method may proceed to step 208, where the engine may be operated with typical engine operating conditions.

Returning to step 204, if the one or more cylinder diagnostic conditions are met the method may proceed to step 210, where one or more cylinder diagnostic tests based on vibration levels and/or pre-turbine exhaust gas temperatures may be performed following the methods described in detail below with reference to FIGS. 3A-5.

Following execution of the one or more cylinder diagnostic tests, the method may proceed to step 212, where it is determined whether at least one fault flag is received. If at least one fault flag is received at step 212, the method may continue to step 214, where an indication that at least one cylinder is degraded may be generated and one or more engine operating conditions may be altered to account for the at least one degraded cylinders (e.g., to reduce or redistribute fueling, an engine load, an engine speed, etc. among the cylinders). In some examples, the indication may include identification of a degraded component, e.g., piston ring, fuel injector, etc. In other examples, the indication may include a severity or confidence level of degradation. The method may continue to step 216, where the engine may be operated with the one or more altered engine operating conditions. In one example, instructions may be given to operate the engine with the one or more altered engine operating conditions based on receipt of the at least one fault flag, such as operating with reduced or redistributed fueling, engine speed, and/or engine load to mitigate further degradation.

Returning to step 212, if no fault flag is received, the method may continue to step 206, where an indication of no cylinder or system degradation may be generated. In other embodiments, no indication may be generated at step 206, and an absence of the indication may be inferred, e.g., by a technician or a vehicle operator, as an absence of cylinder or system degradation. Accordingly, and as indicated above, in FIG. 2, step 206 is indicated in dashing, as generating the indication may be optional. From step 206, the method may proceed to step 208, where the engine may be operated with typical engine operating conditions.

Figure 3A:
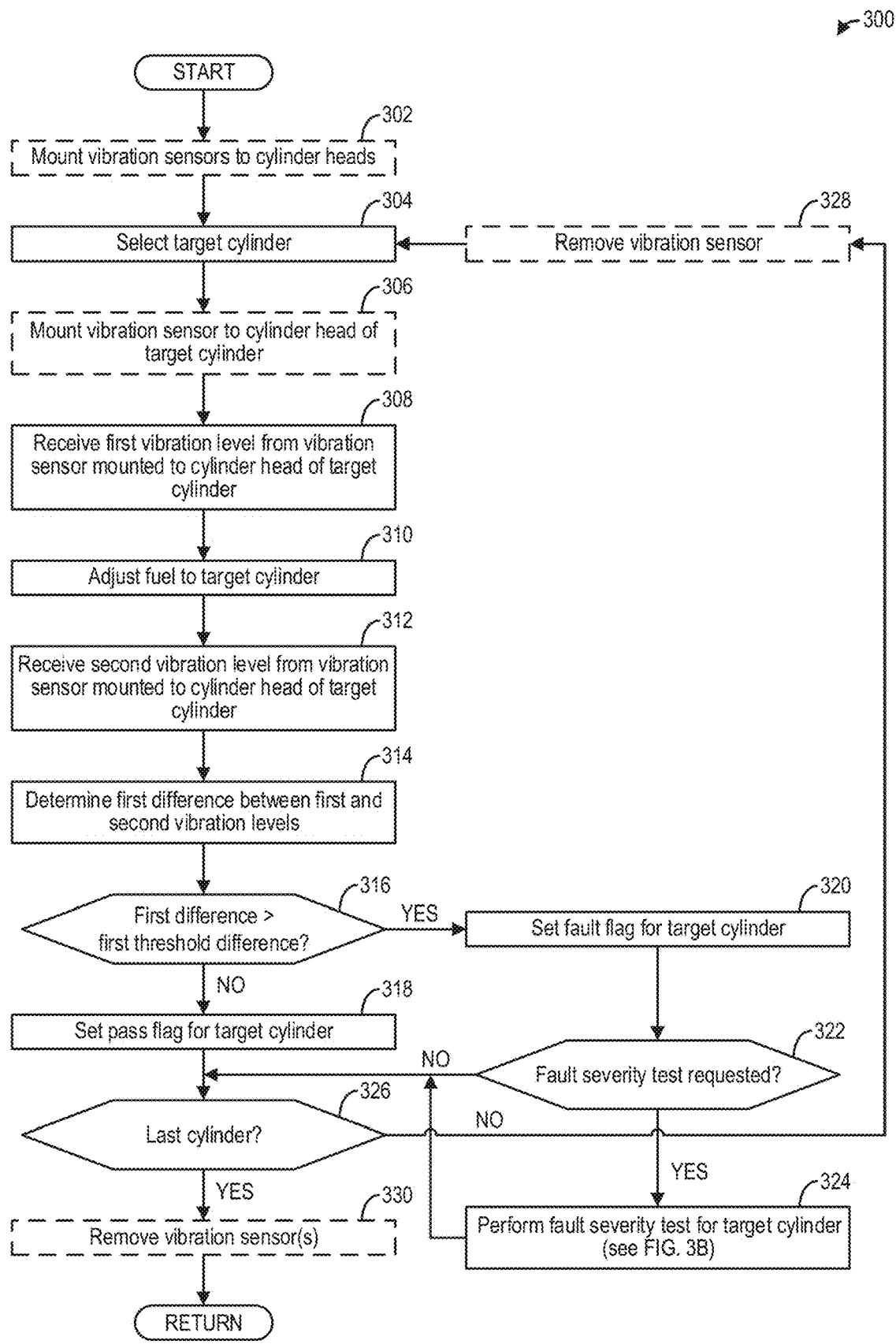
FIGS. 3A and 3B show flow charts of methods for diagnosing each of one or more cylinders of a plurality of cylinders in an engine based on a difference in vibration levels prior to and following perturbation of one of the plurality of cylinders, according to an embodiment of the present disclosure.
Figure 3B:
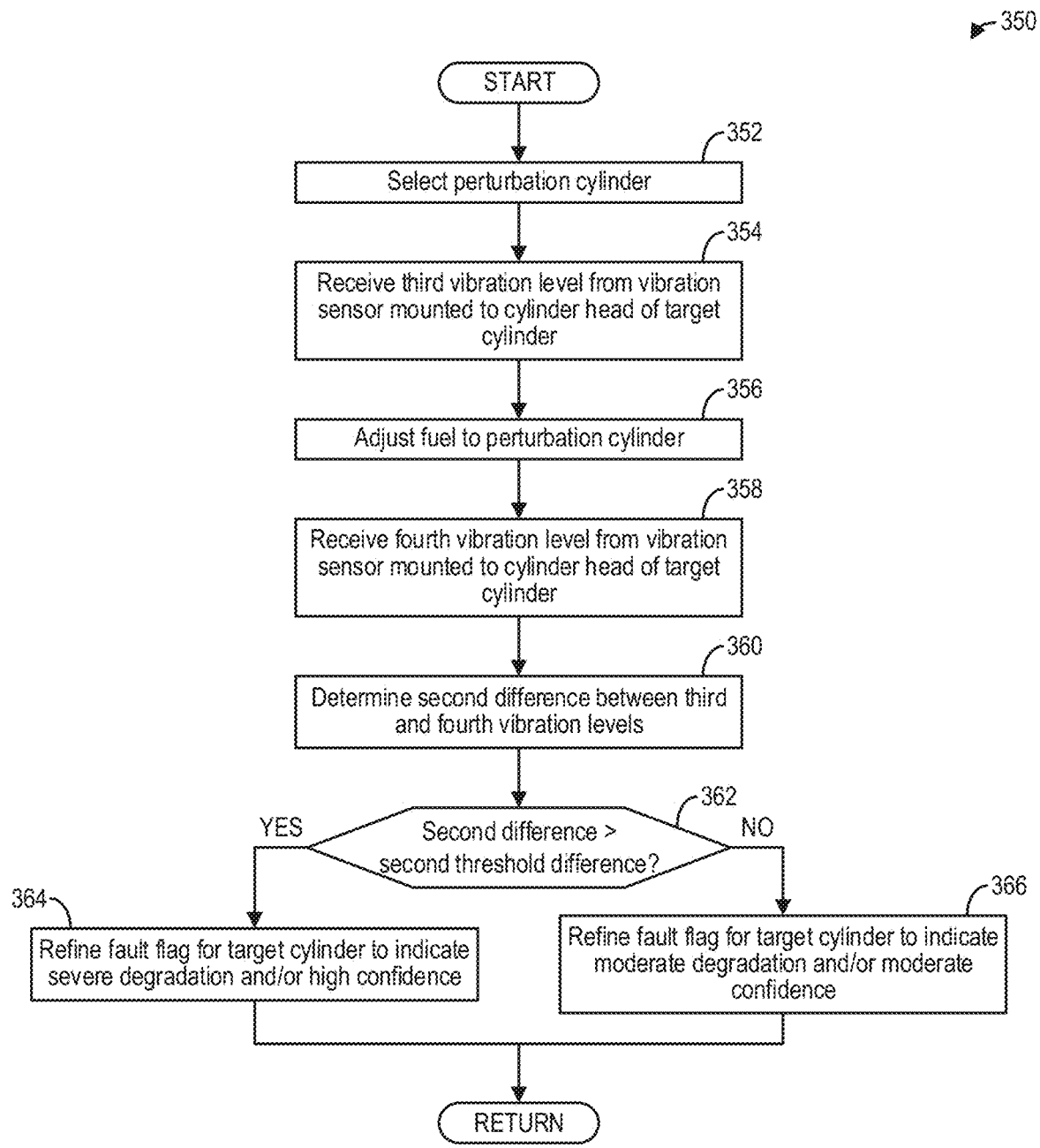

Referring now to FIG. 3A, a method 300 for diagnosing one or more cylinders in an engine based on a difference in monitored vibration levels during a diagnostic operation is illustrated. In one embodiment, the method may include selecting one or more target cylinders to which vibration sensor(s) are individually coupled. During engine operation, the one or more target cylinders may be actively perturbed, e.g., fuel may be adjusted thereto. At the same time, a plurality of remaining cylinders of the engine may be passively perturbed, e.g., by redistributing an engine load among the plurality of remaining cylinders. During the perturbation, vibration feedback may be obtained for the target cylinder, e.g., measured for at least a threshold duration. Vibration level differences during the perturbation may be compared to one or more threshold vibration level differences indicative of one or more cylinder conditions. FIG. 3B depicts an alternative or additional method 350, which in one embodiment may indicate severity and/or confidence in a determined condition of a target cylinder. Each cylinder of the engine may be diagnosed following the method described below, or alternatively, one or a subset of cylinders of the engine may be diagnosed. In one example, the one or more vibration sensors used in the methods described below may not be calibrated following initial manufacture of the vibration sensor. In some examples, increased engine operating power may produce increased vibration level difference signals. In some examples, the one or more diagnostic conditions described above, e.g., engine power at mid to high load range, may contribute to vibrations having sufficiently strong signals to preclude more complex sensor calibration and/or greater sensitivity sensor designs. In one embodiment, the method of FIG. 3A may partially or wholly substitute step 210 in the method described in detail above at FIG. 2.

The method may begin at step 302, where vibration sensors are mounted to the cylinder heads of the cylinders of the engine. In one embodiment, there may be a plurality of vibration sensors, for example one for each cylinder or each target cylinder of the engine. Alternatively, and discussed below, there may be fewer vibration sensors, e.g., one sensor, which may be coupled and decoupled in succession as the diagnosis proceeds to each target cylinder in sequence. Accordingly, in FIG. 3A, step 302 is indicated in dashing, as certain embodiments may include mounting of only one vibration sensor upon determination of the target cylinder undergoing the diagnostic test (e.g., following selection of the target cylinder at step 304). In one embodiment, mounting the vibration sensor to the cylinder head may include positioning the vibration sensor to remain in fixed or otherwise direct physical contact with the cylinder head during engine operation. In one embodiment, the surfaces of the cylinder heads may not be altered, e.g., structurally or compositionally, in any manner prior to the mounting of the vibration sensor. In another embodiment, the surfaces of the cylinder heads may not be prepared, e.g., cleaned, grease and/or oil removed, etc., in any manner prior to the mounting of the vibration sensor. In one example, the vibration sensor may be coupled directly or indirectly to the cylinders. In one example, direct coupling may include removably mounting the vibration sensor to the cylinder (e.g., the cylinder head) via magnetization, light adhesive, etc. In one example, indirect coupling may include removably mounting the vibration sensor to an engine component adjacent to the cylinder. In another example, the vibration sensors may be permanently or semi-permanently (e.g., removable, but intended to remain throughout typical engine operation) coupled, e.g., bolted or welded, to the cylinder head at manufacture.

The method may continue to step 304, where a target cylinder may be selected for diagnosis. In an embodiment where step 302 is not included, the method may begin at step 304. In one embodiment, the target cylinder may be a first cylinder whereat a vibration level may be monitored. In another embodiment, a subset of target cylinders or a sequence of target cylinders may be selected prior to meeting one or more cylinder diagnostic conditions (such as the one or more cylinder diagnostic conditions described in detail above at step 204 of FIG. 2) in some examples or upon or following meeting the one or more cylinder diagnostic conditions in other examples. In one example, the cylinder test ordering may be preset at the controller, e.g., the first cylinder may be the first cylinder of a firing order. In another embodiment, a technician may select the order of diagnosis, e.g., following results from prior diagnostic tests. In one embodiment, the cylinder test ordering may be random (e.g., selected at the controller according to a pseudorandom number generator). Additionally or alternatively, the first cylinder (or any target cylinder) may be pre-flagged, e.g., prior to the testing conditions being met, for diagnosis based on various conditions such as an age of the cylinder. In one embodiment, each target cylinder may be selected responsive to the one or more cylinder diagnostic conditions being met.

In an embodiment where step 302 is not included, the method may continue to step 306, where a vibration sensor may be mounted to the cylinder head of the target cylinder selected at step 304. As above, the vibration sensor may be transiently coupled to the cylinder head. In an example where step 302 is included, step 306 may be excluded. Accordingly, in FIG. 3A, step 306 is indicated in dashing, as mounting and removing a vibration sensor to/from the cylinder head of each target cylinder in sequence may be optional.

The method may continue to step 308, where a first vibration level may be received from the vibration sensor mounted to the cylinder head of the target cylinder. The first vibration level may be stored in controller memory. In an exemplary embodiment, with the target cylinder fueled and the engine operated for a first duration greater or equal to a first threshold duration, e.g., 1.5 to 3 minutes, the first vibration level may be measured and received. In an example, the first vibration level may be an average vibration level over the monitored duration, an average peak vibration level, or other suitable vibration level metric. In an embodiment of the method, an operating condition of the diagnostic test may include operating the engine at steady state above a threshold for the duration of the vibration monitoring (see method 200). As an example, the operating conditions may include performing the diagnostic test with the engine at its rated load, power, and speed. In another example, the operating conditions may include performing the diagnostic test at the highest load, power, and speed the engine can safely run given an anomalous cylinder, e.g., notch 6 and close to 80% rated RPM.

The method may continue to step 310, where a fueling adjustment may be made to the target cylinder. In one embodiment, the adjustment may include cutting fuel to the target cylinder. Additional or alternative perturbations to the target cylinder, e.g., reducing fuel by 50%, may be included in the method. In one example, the amount of fuel delivered to the remaining cylinders may be increased to maintain torque.

The method may continue to step 312, where a second vibration level may be received from the vibration sensor mounted to the cylinder head of the target cylinder. The second vibration level may be stored in controller memory. In an exemplary embodiment, following fuel cut to the target cylinder and the engine operated for at least a second threshold duration, e.g., 1.5 to 3 minutes, the second vibration level may be measured and received.

The method may proceed to step 314, where a first vibration level difference is determined between the first and second vibration levels, e.g., a first feedback. In an example, the first vibration level difference may be measured as a percent change in magnitude between the first and second vibration levels, e.g., 5%, or an absolute or signed magnitude of the output of the vibration sensor.

The method may proceed to step 316, where the first vibration level difference may be compared to a first threshold difference. In an example where the first vibration level changes by less than the first threshold difference (e.g., less than 10%), the method may continue to step 318, where a pass flag may be set for the target cylinder. In one example, the pass flag may be set for the target cylinder when the first vibration level difference is 5%. In an example where the first vibration level changes by more than the first threshold difference, e.g., the first vibration level difference is 11%, the method may continue to step 320, where a fault flag may be set for the target cylinder.

If the fault flag is set for the target cylinder, the method may continue to step 322, where the method may include determining whether a fault severity test is requested. The fault severity test may include additional vibration level measurements to support confidence in a cylinder condition determination and/or determine a severity of the cylinder condition. If a fault severity test is requested, the method may continue to step 324, where a fault severity test is performed for the target cylinder. One embodiment of the fault severity test is described in detail below with reference to FIG. 3B.

From step 318 or step 322, at step 326, the method may include determining whether the target cylinder is the last cylinder to be tested. In one embodiment, the last cylinder may be determined based on a number of cylinders in the engine and a position of the target cylinder (e.g., in physical space). In another embodiment, the last cylinder may be determined based on a cylinder diagnostic order stored in controller memory. In another embodiment, the technician may determine whether the target cylinder is the last cylinder.

If it is determined that the target cylinder is the last cylinder to be tested, the method may continue to step 330, where the one or more vibration sensors are removed or otherwise decoupled from the one or more cylinders, respectively. In FIG. 3A, step 330 is indicated in dashing, as removing the one or more vibration sensors from the cylinder heads of the one or more cylinders may be optional (e.g., the one or more vibration sensors may be permanently mounted in certain embodiments). In an exemplary embodiment, the method of FIG. 3A may return to the method of FIG. 2.

Returning to step 326, if it is determined that the target cylinder is not the last cylinder to be tested, the method may continue to step 328, where, if a single, transiently mounted vibration sensor is used for the diagnostic test, the vibration sensor may be removed or otherwise decoupled from the target cylinder. If step 328 is excluded (e.g., if multiple vibration sensors are used), the method may return to step 304 and the diagnostic test may continue for each target cylinder of all remaining cylinders of the engine to be tested (e.g., to diagnose each target cylinder based on a respective vibration level difference). Accordingly, in FIG. 3A, step 328 is indicated in dashing, as removing the vibration sensor from the cylinder head of the target cylinder may be optional when one vibration sensor is mounted on each target cylinder to be tested.

In an exemplary embodiment, the vibration sensor may be coupled to the first cylinder and, following the diagnostic test of the first cylinder, the vibration sensor may be decoupled from the first cylinder. Thereafter, for at least a second cylinder of a plurality of remaining cylinders of the engine, the vibration sensor may be coupled to the second cylinder and the diagnostic test may be performed as above for the second cylinder. In an embodiment, upon receiving a second feedback from the diagnostic test of the second cylinder (e.g., the output of the vibration sensor before and after a fuel cut-out to the second cylinder), a second vibration level difference may be compared to the first threshold difference. If the second vibration level difference is greater than or equal to the first threshold difference, a second indication of a second degradation condition may be set for the second cylinder (e.g., a fault flag may be set). The vibration sensor may then be decoupled from the second cylinder. As an example, a first target cylinder may produce a first vibration level difference of 5% during the diagnostic test, a second target cylinder may produce a second vibration level change of 11% during the diagnostic test, and a third target cylinder may produce a vibration level change of 5% during the diagnostic test. In such an example, an indication of anomalous performance may be generated for the second cylinder and an indication of expected performance may be generated for the first and third cylinders (or no indication may be generated for the first and third cylinders). In this way, anomalous cylinder performance may be determined by relative discrete differences of cylinder vibration levels among the plurality of cylinders of the engine, rather than, e.g., by comparison to a calibrated standard or continuous curve of cylinder vibration levels. The engine may be operated according to the indication received and/or the vibration sensor may be coupled/decoupled to further cylinders in sequence for further diagnostics. An advantage to this exemplary embodiment is that a single vibration sensor may be used to perform the diagnostics described herein. However, other embodiments may include using multiple and/or permanently coupled vibration sensors.

Referring now to FIG. 3B, a method 350 for diagnosing fault severity of a degraded cylinder in an engine based on a difference in monitored vibration levels during a diagnostic operation is illustrated. In one embodiment, the method may be a subroutine of the method depicted in FIG. 3A. Accordingly, in one embodiment, the method of FIG. 3B may partially or wholly substitute step 210 in the method described in detail above at FIG. 2. In one embodiment, the subroutine may be performed as a fault severity test for a target cylinder following the receipt of an indication of a vibration level difference greater than or equal to a first threshold vibration level difference, e.g., indicating a first degradation condition. Additionally or alternatively, the method may be selected independent of the other methods described herein and/or following other diagnostic tests, e.g., a pop test, in some examples. The fault severity test may monitor the vibration level at the (first) target cylinder prior to, during, and following perturbation of a second, perturbation cylinder. A determined vibration level difference for the target cylinder may be compared to a second threshold vibration level difference and used to indicate a severity of the first degradation condition and/or a confidence in the first degradation condition.

The method may begin at step 352, where a perturbation cylinder may be selected. In one embodiment, the perturbation cylinder may be any one of the plurality of cylinders of the engine except the target cylinder. In another embodiment, a subset of cylinders or a sequence of cylinders may be selected for perturbation prior to, upon, or following meeting one or more cylinder diagnostic conditions, such as the one or more cylinder diagnostic conditions described in detail above at step 204 of FIG. 2. In one example, the cylinder perturbation ordering may be preset at the controller. In another embodiment, a technician may select the order of diagnosis, e.g., following results from prior diagnostic tests. In one embodiment, the cylinder perturbation ordering may be random (e.g., selected at the controller according to a pseudorandom number generator). Additionally or alternatively, the perturbation cylinder may be pre-flagged, e.g., prior to the testing conditions being met, as a non-degraded cylinder for comparison based on various conditions such as the results of preceding diagnostics. In one embodiment, each perturbation cylinder may be selected responsive to the one or more cylinder diagnostic conditions being met.

The method may continue to step 354, where a third vibration level may be received from the vibration sensor mounted to the cylinder head of the target cylinder. In one exemplary embodiment, the target cylinder may be a cylinder for which a fault flag was set and the fault severity test requested, as described in the method of FIG. 3A. The first vibration level may be stored in controller memory.

Continuing to step 356, the method may include adjusting fuel to the perturbation cylinder. In one example, the adjusting may include cutting or otherwise reducing (e.g., partially reducing, such as by 50%) fuel to the perturbation cylinder while providing equal fuel amounts to the remaining cylinders, including the target cylinder.

The method may continue to step 358, where a fourth vibration level may be received from the vibration sensor mounted to the cylinder head of the target cylinder. In one example, following fuel cut to the perturbation cylinder and the engine operated for at least a threshold duration, e.g., 1.5 to 3 minutes, the fourth vibration level of the target cylinder may be measured and received. The fourth vibration level may be stored in controller memory.

The method may continue to step 360, where a second vibration level difference may be determined between the third and fourth vibration levels, e.g., a second feedback. In an example, the second vibration level difference may be measured as a percent change in magnitude between the third and fourth vibration levels, e.g., 4%, or an absolute or signed magnitude.

The method may continue to step 362, where the second vibration level difference may be compared to a second threshold difference, e.g., distinct from the first threshold difference of the method of FIG. 3A. In an exemplary embodiment, the second threshold difference may be less than the first threshold difference of the method of FIG. 3A. If the second vibration level difference is less than the second threshold difference (e.g., less than 5%), the method may proceed to step 366, where a fault flag for the target cylinder may be refined to indicate moderate degradation and/or moderate confidence in a determination of degradation, such as during the method of FIG. 3A. In one example, the fault flag set for the target cylinder, combined with a second vibration difference of 4%, may result in a refined fault flag being generated, the refined fault flag indicating a moderate severity degradation condition and/or moderate confidence in the degradation condition determination. If the second vibration level difference is greater than the second threshold difference (e.g., greater than or equal to 5%) the method may proceed to step 364, where the fault flag for the target cylinder may be refined to indicate severe degradation and/or high confidence in the determination of degradation, such as during the method of FIG. 3A. In one example, the fault flag set for the target cylinder, combined with a second vibration level difference of 6%, may result in a refined fault flag being generated, the refined fault flag indicating a high severity degradation condition and/or high confidence in the degradation condition determination.

In one example, with the engine ran at steady state, fuel to one cylinder at a time may be cut out. When any cylinder is cut out in a sequential or a pattern, the vibration of a weak cylinder jumps. When fuel to the weak cylinder is cut out, the vibration levels reduce. In an example, when fuel to a healthy cylinder is cut out the vibration level changes marginally. In this way, a weak cylinder may be identified.

In an exemplary embodiment, the method of FIG. 3B may return to the methods of FIG. 3A and/or FIG. 2.

Figure 4:
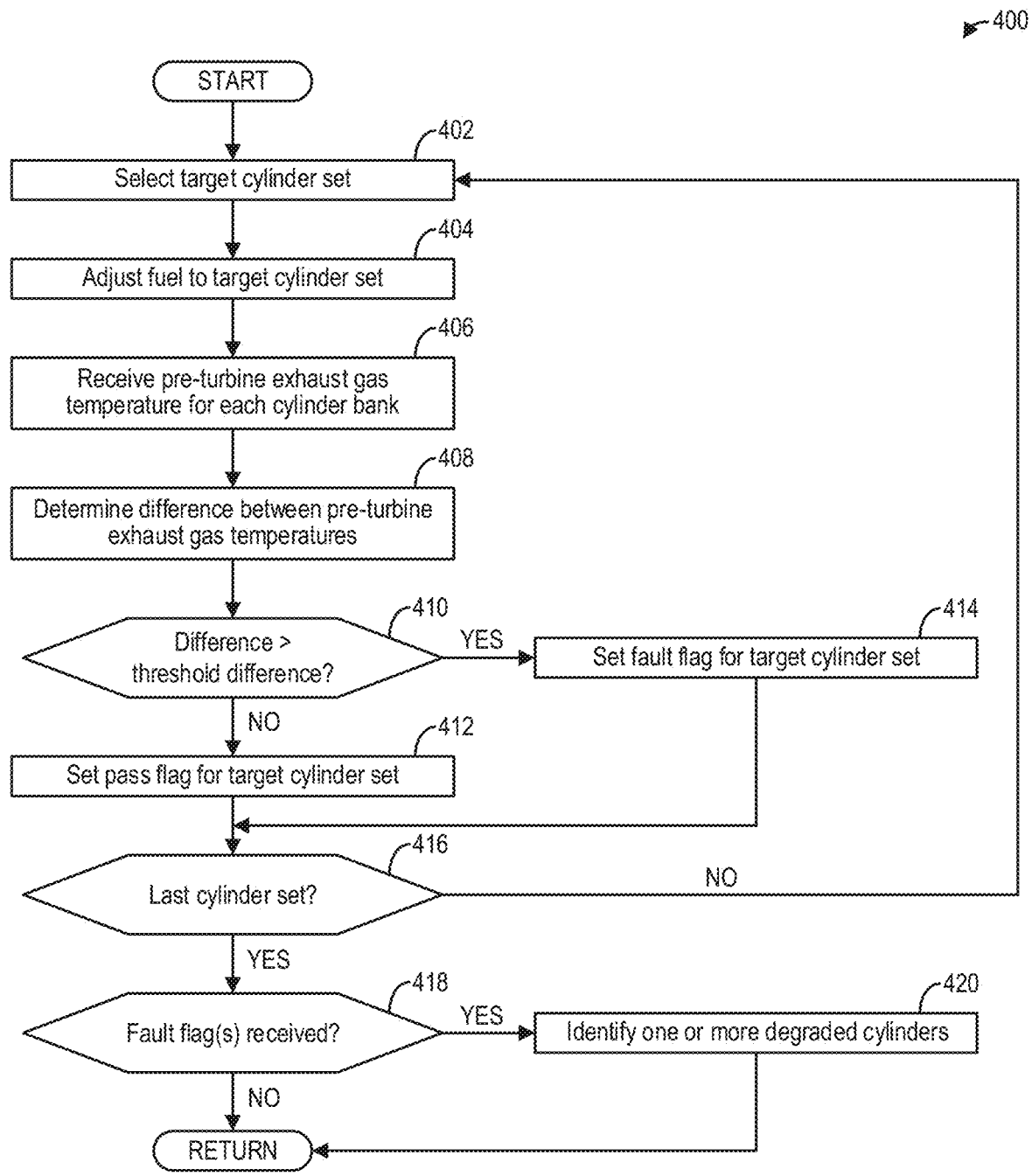
FIG. 4 shows a flow chart of a method for diagnosing a set of one or more cylinders in an engine based on a difference in pre-turbine exhaust gas temperatures between cylinder banks following perturbation of the set of one or more cylinders, according to an embodiment of the present disclosure.

Turning now to FIG. 4, a method 400 for diagnosing one or more cylinders based on a difference in monitored pre-turbine exhaust gas temperatures during a diagnostic operation is illustrated. In one embodiment, the method may include selecting a target cylinder set. A fuel adjustment may be made to the target cylinder set, e.g., by cutting fuel to the target cylinder set. With the engine running, the pre-turbine exhaust gas temperature may be received for each cylinder bank of the engine, e.g., a first cylinder bank including the target cylinder set and a second cylinder bank. The difference between the pre-turbine exhaust gas temperatures for the first and second cylinder banks may be received and compared to a threshold temperature difference indicative of a cylinder condition. One or more cylinder sets of the engine may be diagnosed following the method described below. In one embodiment, each and every cylinder of the engine may be included in the diagnosis (e.g., via diagnosis of multiple independent or overlapping cylinder sets). Alternatively, a subset of the cylinders of the engine may be diagnosed. In one embodiment of the method, at least first and second pre-turbine exhaust gas temperature sensors may be respectively mounted to first and second exhaust passages coupled to the first and second cylinder banks, respectively. In an embodiment, the pre-turbine exhaust gas temperature sensors may be permanently affixed to the exhaust passages, e.g., at manufacture. In an alternate embodiment, pre-turbine exhaust gas temperature sensors may be temporarily affixed, e.g., at a site of service. In an additional or alternative embodiment, vibration level measurements (e.g., via vibration sensors) may be obtained for each of the first (target) cylinder bank and the second cylinder bank during the exemplary diagnostic test of FIG. 4. In one embodiment, the method of FIG. 4 may partially or wholly substitute step 210 in the method described in detail above at FIG. 2.

The method may begin at step 402, where a target cylinder set may be selected. In one embodiment, the target cylinder set or a sequence of target cylinder sets may be selected prior to, upon, or following meeting one or more cylinder diagnostic conditions (such as the one or more cylinder diagnostic conditions described in detail above at step 204 of FIG. 2). In one example, the target cylinder set ordering may be preset at the controller, e.g., according to a routine that may pinpoint a degraded cylinder in an efficient manner. In another embodiment, a technician may select the order of diagnosis, e.g., following results from prior diagnostic tests. Additionally or alternatively, the (first) target cylinder set (or any target cylinder set) may be pre-flagged, e.g., prior to the testing conditions being met, for diagnosis based on various conditions such as engine performance data. In an exemplary embodiment, the first two cylinders of a first cylinder bank of a dual bank engine may be selected as the target cylinder set.

The method may continue to step 404, where a fueling adjustment may be made to the target cylinder set. In one embodiment, the adjustment may include cutting fuel to the target cylinder set. In another embodiment, the adjustment may include reducing the fuel, e.g., by 50%. In an exemplary embodiment, fuel may be cut to the target cylinder set and the engine may be operated for a duration of at least a threshold duration. The threshold duration may be subject to change based on the number of cylinders and the configuration of the engine. In one example, a threshold duration of 4 minutes may be appropriate for a 12 cylinder engine. In one example, the duration may be distinct from and/or not overlapping with the durations of the exemplary methods described in FIGS. 3A-3B. The diagnostics described in FIGS. 3A-3B and FIG. 4 may be performed during different time intervals and for different threshold durations.

The method may continue to step 406, where pre-turbine exhaust gas temperatures are received for each cylinder bank. In an exemplary embodiment, a first pre-turbine exhaust gas temperature corresponding to the first cylinder bank (including the target cylinder set) and a second pre-turbine exhaust gas temperature corresponding to the second cylinder bank may be respectively received from the first and second exhaust gas temperature sensors mounted to the first and second exhaust passages, respectively. In one example, the first and second pre-turbine exhaust gas temperatures are 570 and 600° C., respectively. The first and second pre-turbine exhaust gas temperatures may be stored in controller memory.

The method may continue to step 408, where a pre-turbine exhaust gas temperature difference between the first and second pre-turbine exhaust gas temperatures may be determined. In one example, the pre-turbine exhaust gas temperature difference may be measured as a percent change in magnitude between the first and second pre-turbine exhaust gas temperatures, e.g., 10%, or an absolute or signed magnitude, e.g., 60° C.

The method may proceed to step 410, where the pre-turbine exhaust gas temperature difference may be compared to a threshold difference. If the pre-turbine exhaust gas temperature difference is less than the threshold difference (e.g., less than 60° C. or less than 10%), the method may proceed to step 412, where a pass flag may be set for the target cylinder set. In one example, a pass flag may be set for the target cylinder set when the threshold difference is 5%. In an example where the pre-turbine exhaust gas temperature difference is more than the threshold difference, e.g., the pre-turbine exhaust gas temperature difference is 11%, the method may continue to step 414, where a fault flag may be set for the target cylinder set.

From step 412 or step 414, at step 416, the method may include determining whether the target cylinder set is the last cylinder set to be tested. In one embodiment, the last cylinder set may be determined based on a number of cylinders in the engine and a position of the target cylinder set (e.g., in physical space). In another embodiment, the last cylinder set may be determined based on a cylinder set diagnostic order stored in controller memory. In another embodiment, the technician may determine whether the target cylinder set is the last cylinder set. In an example where at step 416 it is determined that the target cylinder set is the last cylinder set, the method may continue to step 418, where the method may include determining whether one or more fault flags were received. In one example, each fault flag may store in controller memory a location of a cylinder set including a degraded cylinder.

In an example where one or more fault flags were received, the method may proceed to step 420, where one or more degraded cylinders may be identified. In an exemplary embodiment, the one or more degraded cylinders may be determined based on whether cylinder sets corresponding to received pass and fault flags overlap and to what extent. For example, if a cylinder set including cylinders 1 and 2 and a cylinder set including cylinders 4 and 5 receive pass flags and a cylinder set including cylinders 2 and 3 and a cylinder set including cylinders 3 and 4 receive fault flags, the controller may determine that cylinder 3 is degraded. In an exemplary embodiment, following the identification of the one or more degraded cylinders or from step 418 with no fault flags received, the method may return, e.g., to the method described in detail above with reference to FIG. 2.

Returning to step 416, in an example where the method includes determining that the target cylinder set is not the last cylinder set, the method may return to step 402 and the diagnostic test may continue for each target cylinder set of all remaining cylinder sets of the engine to be tested (e.g., to diagnose each target cylinder set based on a respective pre-turbine exhaust gas temperature difference).

Figure 5:
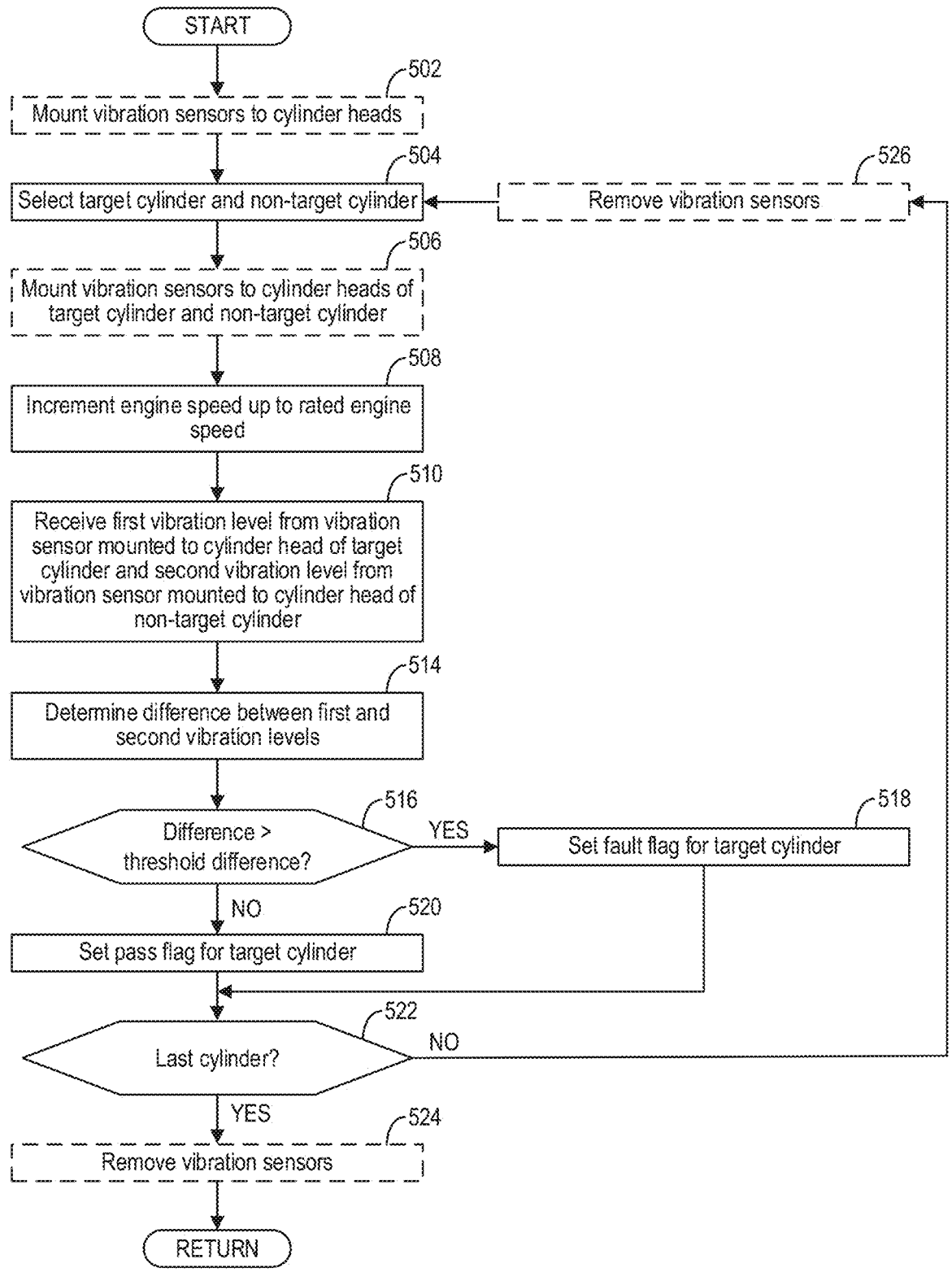
FIG. 5 shows a flow chart of a method for diagnosing one or more cylinders in an engine based on a difference in vibration levels during a speed sweep of each of the one or more cylinders, according to an embodiment of the present disclosure.

Referring now to FIG. 5, a method 500 for diagnosing one or more cylinders in an engine based on a difference in monitored vibration levels during a diagnostic operation is illustrated. In one embodiment, the method may include selecting at least a first (e.g., target) cylinder and a second (e.g., non-target) cylinder to which vibration sensors are individually coupled, e.g., mounted to the cylinder head, as described previously. The engine may be operating at idle and set to a highest throttle level and, while sweeping from idle to a rated speed, a first vibration level may be received for the first cylinder and a second vibration level may be received for the second cylinder. A difference in the first and second vibration levels during the speed sweep may be compared to a threshold vibration level difference indicative of a cylinder condition. Each cylinder of a multi-cylinder engine may be diagnosed following the method described below, or alternatively, a subset of cylinders of the engine may be diagnosed. In one embodiment of the method, one or more cylinder diagnostic conditions may include cranking the engine and stabilizing the engine at idle. In one embodiment, the method of FIG. 5 may partially or wholly substitute step 210 in the method described in detail above at FIG. 2.

The method may begin at step 502, where vibration sensors are mounted to the cylinder heads of the cylinders of the engine. In one embodiment, there may be a plurality of vibration sensors, e.g., one for each cylinder or each target cylinder of the engine. Alternatively, and discussed below, there may be fewer vibration sensors, e.g., two sensors, which may be coupled and decoupled in succession as the diagnosis proceeds to each target cylinder and non-target cylinder in sequence. Accordingly, in FIG. 5, step 502 is indicated in dashing, as certain embodiments may include mounting of only two vibration sensors upon determination of the target cylinder and the non-target cylinder undergoing the diagnostic test (e.g., following selection of the target cylinder and the non-target cylinder at step 504). In one embodiment, mounting the vibration sensors to the cylinder heads may include positioning the vibration sensors to remain in fixed or otherwise direct physical contact with the cylinder heads during engine operation. In one embodiment, the surfaces of the cylinder heads may not be altered, e.g., structurally or compositionally, in any manner prior to the mounting of the vibration sensors. In another embodiment, the surfaces of the cylinder heads may not be prepared, e.g., cleaned, grease and/or oil removed, etc., in any manner prior to the mounting of the vibration sensors. In one example, the vibration sensors may be coupled directly or indirectly to the cylinders. In one example, direct coupling may include removably mounting the vibration sensors to the cylinders (e.g., the cylinder heads) via magnetization, light adhesive, etc. In one example, indirect coupling may include removably mounting the vibration sensors to engine components adjacent to the cylinders. In another example, the vibration sensors may be permanently or semi-permanently (e.g., removable, but intended to remain throughout typical engine operation) coupled, e.g., bolted or welded, to the cylinder heads at manufacture.

The method may continue to step 504, where a target cylinder and a non-target cylinder are selected for diagnosis. In an embodiment where step 502 is not included, the method may begin at step 504. In one embodiment, the target cylinder may be a first cylinder and the non-target cylinder may be a second cylinder, whereat respective vibration levels may be monitored. In another embodiment, a subset of target cylinders and a subset of non-target cylinders, or a sequence of target and non-target cylinder pairs may be selected prior to, upon, or following meeting one or more cylinder diagnostic conditions (such as the one or more cylinder diagnostic conditions described in detail above at step 204 of FIG. 2). In one example, the cylinder test ordering may be preset at the controller, e.g., the first cylinder may be the first cylinder of a firing order. In another embodiment, a technician may select the order of diagnosis, e.g., following results from prior diagnostic tests. In one embodiment, the cylinder test ordering may be random (e.g., selected at the controller according to a pseudorandom number generator). Additionally or alternatively, the first cylinder (or any target cylinder) may be pre-flagged (e.g., prior to the testing conditions being met) for diagnosis based on various conditions such as an age of the cylinder, while the second cylinder (or any non-target cylinder) may be pre-flagged as a non-degraded cylinder for comparative purposes based on various conditions such as the age of the cylinder. In one embodiment, each target cylinder and each non-target cylinder may be selected responsive to the one or more cylinder diagnostic conditions being met.

In an embodiment where step 502 is not included, the method may continue to step 506, where vibration sensors may be mounted to the cylinder heads of the target cylinder and the non-target cylinder selected at step 504. As above, the vibration sensors may be removably coupled to the cylinder heads. In an example where step 502 is included, step 506 may be excluded. Accordingly, in FIG. 5, step 506 is indicated in dashing, as mounting and removing vibration sensors to/from the cylinder heads of each target cylinder and non-target cylinder pair in sequence may be optional.

The method may continue to step 508, where the engine speed may be incremented up from idle or another relatively low engine speed to a rated engine speed, e.g., a full throttle level or a maximum notch, so that the engine sweeps through all engine speeds from the (current) engine speed to the rated engine speed. In one example, a rate at which pressure builds up inside the engine may be reflected in the vibration sensor values. In one example, the duration of the test may depend on the configuration of the engine and how fast the engine reaches full load from idle.

The method may continue to step 510, where a first vibration level may be received from the vibration sensor mounted to the cylinder head of the target cylinder and a second vibration level may be received from the vibration sensor mounted to the cylinder head of the non-target cylinder. In one example, the output of the vibration sensor over the sweep is obtained and saved to form a vibration profile, e.g., a series of measurements over time. The first and second vibration profiles may be stored in controller memory. In an example where vibration sensors are mounted to all cylinder heads of the engine, vibration readings may be received for all cylinders during a single speed sweep.

The method may continue to step 514, where a vibration level difference may be determined between the first and second vibration levels. In one example, the vibration difference may be a difference between the vibration profiles determined between the first and second vibration levels over the sweep. In one example, a peak vibration of the vibration profiles may be compared. In another example, a rate of increase of the vibration profiles may be compared. In an example, the vibration level difference may be measured as the percent change in magnitude between the target cylinder and the non-target target cylinder, e.g., 5%, or an absolute or signed magnitude.

The method may proceed to step 516, where the vibration level difference may be compared to a threshold difference. In one example, the threshold difference may be distinct from the other threshold vibration level differences described above in the exemplary methods of FIGS. 3A and 3B. If the vibration level difference is less than the threshold difference, e.g., less than 10%, the method may proceed to step 518, where a pass flag may be set for the target cylinder. In one example, the pass flag may be set for the target cylinder when the vibration level difference is 5%. In an example where the vibration level difference is more than the threshold difference, e.g., the vibration level difference is 11%, the method may continue to step 520, where a fault flag may be set for the target cylinder.

From step 518 or step 520, at step 522, the method may include determining whether the target cylinder is the last cylinder to be tested. In one embodiment, the last cylinder may be determined based on a number of cylinders in the engine and a position of the target cylinder (e.g., in physical space). In another embodiment, the last cylinder may be determined based on a cylinder diagnostic order stored in controller memory. In another embodiment, the technician may determine whether the target cylinder is the last cylinder.

In an example where the target cylinder is the last cylinder to be tested, the method may continue to step 524, where the vibration sensors are removed or otherwise decoupled from the cylinders, respectively. In FIG. 5, 524 is indicated in dashing, as removing the vibration sensors from the cylinder heads of the cylinders may be optional (e.g., the one or more vibration sensors may be permanently mounted in certain embodiments). In an exemplary embodiment, the method of FIG. 5 may return to the method of FIG. 2.

Returning to step 522, in an example where it is determined that the target cylinder is not the last cylinder to be tested, the method may continue to step 526, where the vibration sensors may be removed or otherwise decoupled from the target cylinder and the non-target cylinder. If step 526 is excluded (e.g., if multiple, permanently mounted vibration sensors are used), the method may return to step 504 and the diagnostic test may continue for each target cylinder of all remaining cylinders of the engine to be tested (e.g., to diagnose each target cylinder based on a respective vibration level difference). Accordingly, in FIG. 5, step 526 is indicated in dashing, as removing the vibration sensors from the cylinder heads of the target cylinder and the non-target cylinder may be optional when vibration sensors are mounted on each target cylinder and non-target cylinder pair to be tested.

Figure 6:
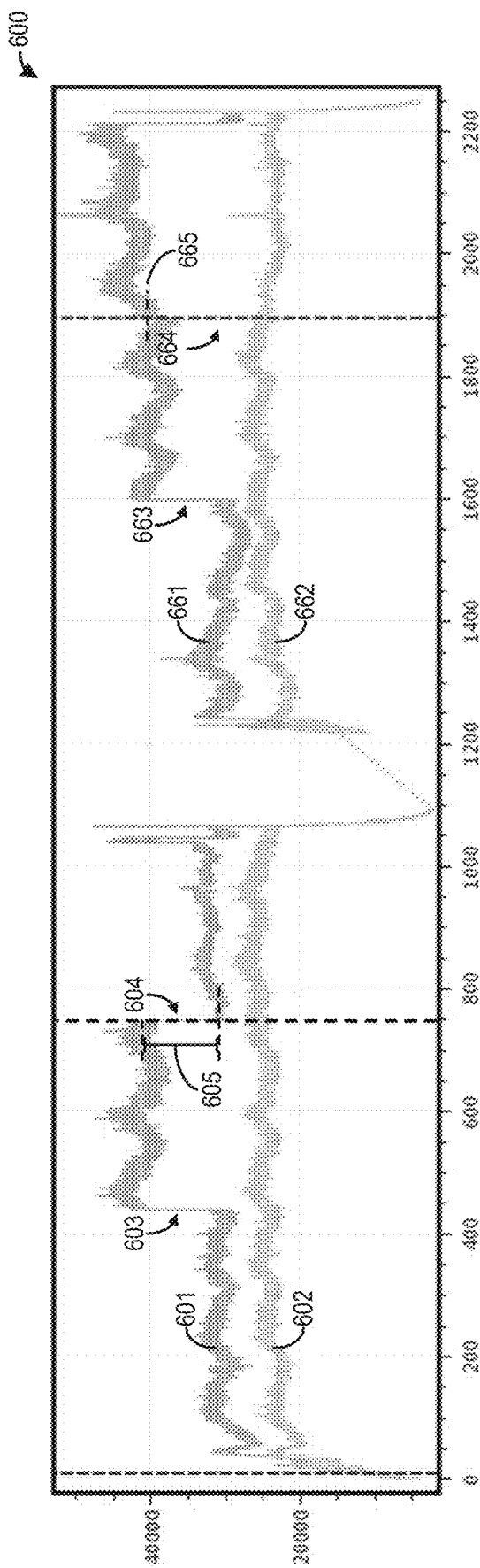
FIG. 6 shows a plot of vibration levels for two exemplary cylinders of an engine during a first exemplary diagnostic operation, according to an embodiment of the present disclosure.

Referring now to FIG. 6, a plot 600 is shown depicting vibration levels for two exemplary cylinders of an engine during an exemplary diagnostic operation, such as the diagnostic operation of FIGS. 3A and 3B. In this example, the x-axis plots time and the y-axis plots vibration levels measured by knock sensors respectively installed on individual cylinder heads. As shown, lines 601 and 602 plotting vibration levels of first and second cylinders, respectively, are depicted. In this example, the first cylinder is a healthy cylinder that has been degraded via simulation at 603. The second cylinder is a healthy cylinder included for comparison. Specifically, at 603, fuel to the first cylinder is cut by half (50%) and the knock sensor response shows a corresponding vibration level increase (in an engine setting with a non-artificially degraded cylinder, the vibration level would already be anomalously high). At 604, fuel is fully cut to the first cylinder and the knock sensor response at 605 shows a significant mean shift of 5-10%. In the example, fuel fully cut to the first cylinder restores vibration to a non-anomalous level. In this way, a weak cylinder may exhibit an increase in an average vibration level (e.g., relative to a healthy cylinder) and the vibration level in the weak cylinder is changes significantly when the fuel is cut to the weak cylinder.

Continuing in this example (e.g., after a duration), lines 661 and 662 plotting vibration levels of first and second cylinders, respectively, are depicted. The first cylinder 661 is a cylinder that has been made weak via simulation at 663. The second cylinder 662 is a healthy cylinder. At 664, fuel is fully cut to the second cylinder and the knock sensor response at 665 shows the vibration level remains relatively constant for the first cylinder indicating a healthy second cylinder. When there is no anomaly, there is none to minimal shift of vibration levels. There may be a slight trending, but no mean shift upon fuel cut out.

Figure 7:
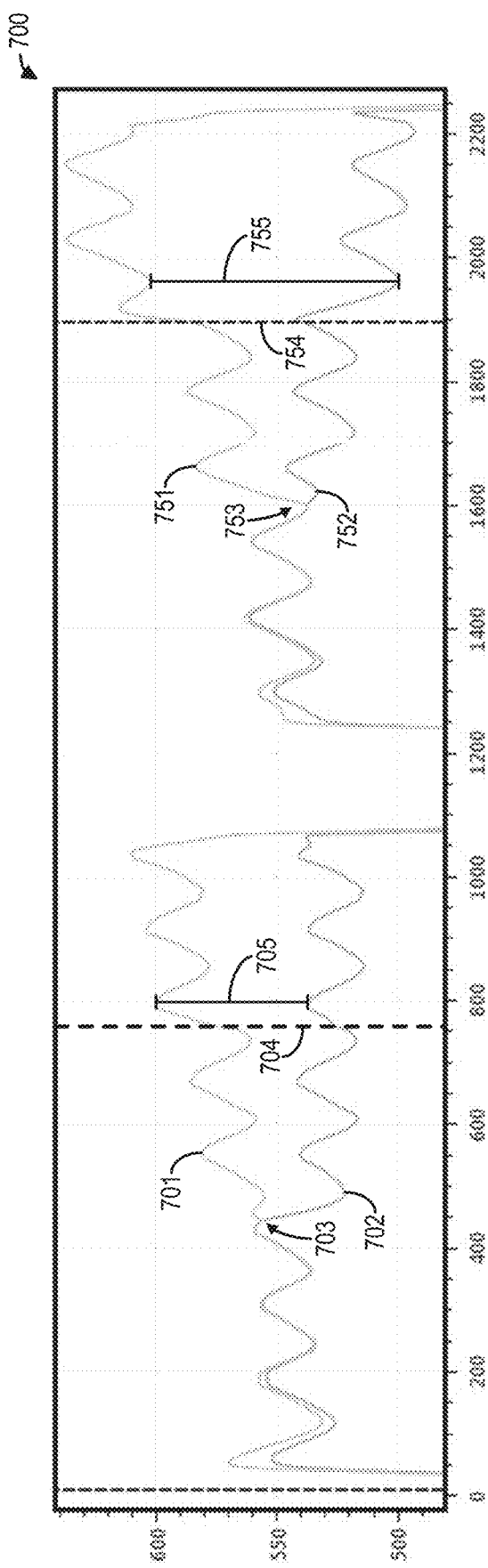
FIG. 7 shows a plot of pre-turbine exhaust gas temperatures for two exemplary cylinder banks of an engine during a second exemplary diagnostic operation, according to an embodiment of the present disclosure.

Referring now to FIG. 7, a plot 700 is shown depicting pre-turbine exhaust gas temperatures for two exemplary cylinder banks of an engine during an exemplary diagnostic operation, such as the diagnostic operation of FIG. 4. In this example, the x-axis plots time and the y-axis plots pre-turbine exhaust gas temperatures measured by exhaust gas temperature sensors respectively installed on exhaust passages from first and second cylinder banks of a multi-cylinder engine. As shown, lines 701 and 702 plotting the pre-turbine exhaust gas temperatures of the first and second cylinder banks, respectively, are depicted. Prior to 703, there is no significant difference in the pre-turbine exhaust gas temperatures of the first and second cylinder banks. At 703, fuel is cut by half (50%) to a first cylinder in the first cylinder bank to simulate a cylinder bank with at least one weak cylinder. At 704, fuel is fully cut to the first cylinder of the first cylinder bank. The exhaust gas temperature sensor response at 705 shows a pre-turbine exhaust gas temperature difference between the first and second cylinder banks less than a threshold difference, e.g., less than 80° C., indicating fuel was cut to a weak cylinder.

Continuing in this example (e.g., after a duration), lines 751 and 752 plotting the pre-turbine exhaust gas temperatures of the first and the second cylinder banks, respectively, are depicted. In this example, the first and second cylinder banks initially include all healthy cylinders. Prior to 753, there is no significant difference in the pre-turbine exhaust gas temperatures of the first and second cylinder banks. At 753, fuel is cut by half (50%) to the first cylinder of the first cylinder bank to simulate a bank with at least one weak cylinder. At 754, fuel is fully cut to a second cylinder of the second cylinder bank, e.g., a healthy cylinder. The exhaust gas temperature sensor response at 755 shows a pre-turbine exhaust gas temperature difference between the first and second cylinder banks greater than the threshold difference, e.g., greater than 80° C., indicating fuel was cut to a healthy cylinder. In this way, when a fuel to a weak cylinder is cut out the reduction in turbo speed is smaller than the reduction in turbo speed when fuel to a healthy cylinder is cut out. In an example of multiple weak cylinders that are to be identified, an approach may include cutting out 2, 3, or 4 cylinders in various combinations.

Figure 8:
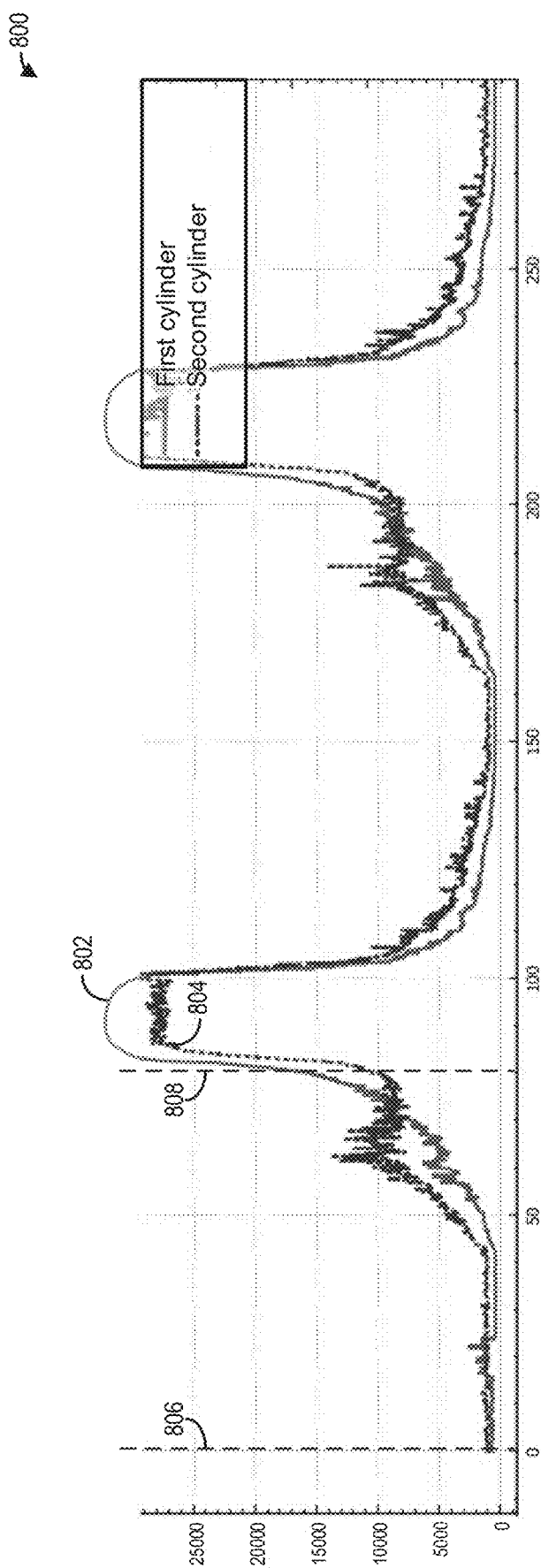
FIG. 8 shows a plot of vibration levels for two exemplary cylinders of an engine during a third exemplary diagnostic operation, according to an embodiment of the present disclosure.

Referring now to FIG. 8, a plot 800 of vibration levels for two exemplary cylinders of an engine during an exemplary diagnostic operation is shown, such as the diagnostic operation of FIG. 5. In this example, the x-axis plots time and the y-axis plots vibration levels as measured by knock sensors respectively installed on individual cylinder heads of first second cylinders of a multi-cylinder engine. As shown, lines plotting vibration profiles of first cylinder 802 and second cylinder 804 are depicted. In this example, the first cylinder is degraded and the second cylinder is healthy. Before dashed line 806, the engine is cranked and stabilized at idle. At dashed line 806, engine is increased to full throttle, e.g., notch to '8'. From the dashed line 806, the engine sweeps up through all speeds to reach the rated speed for the commanded throttle level. At dashed line 808, a significant difference between the vibration profiles of the first and second cylinders becomes evident and indicates an anomalous condition of the first cylinder.

In this way, a method for diagnosing cylinders based on differences in cylinder vibration levels and/or pre-turbine exhaust gas temperatures may reduce service-induced delay and errors related to diagnostic procedures (e.g., misdiagnoses). At least some advantages of diagnosing cylinders in the manner described herein may include that the tests may be performed by technicians in a standard service environment (e.g., with little specialized equipment or limited training), without complex calibration, and may be sufficiently sensitive to detect even non-severely degraded cylinders. Although some embodiments of the methods described herein may use permanently mounted vibration and/or exhaust gas temperature sensors, other embodiments may use one or more transiently mounted sensors, which may be less susceptible to degradation, e.g., due to the extremes of regular engine operation, and therefore may need less frequent replacement. Additionally, transiently mounted sensors may be less likely to block physical access to cylinders and/or other engine components during engine operation or servicing. In some examples, as engine power increases, anomalous vibration levels may increase and noise, vibration, and harshness related issues may decrease, such that the diagnostic conditions identified by the exemplary methods described herein may improve the sensitivity of diagnostic tests. In some examples, performing the methods described herein with the engine running at higher power may enable detection of a wider range of signal variations by avoiding less calibrated/balanced dynamics common to low power engine conditions. Further, in some examples, performing the diagnostic tests while the engine runs at higher loads may preclude complex calibration of sensors due to overall increased vibration levels common to a higher power engine condition. As such, the service experience may be reduced in complexity, which may enable earlier and better diagnoses of engine power loss and allow technicians to identify and address issues associated with degraded components before more costly and labor-intensive degradation modes progress.

The disclosure also provides support for a method for an engine, the method comprising: while receiving first feedback from a vibration sensor coupled to a first cylinder of the engine, perturbing the first cylinder during engine operation, responsive to the first feedback indicating a first vibration level difference greater than or equal to a first threshold difference, setting a first indication of a first degradation condition of the first cylinder, and thereafter operating the engine based on whether or not the first indication was set. In a first example of the method, the method further comprises, for each second cylinder of a plurality of remaining cylinders of the engine, the plurality of remaining cylinders including all cylinders in the engine excepting the first cylinder: with the vibration sensor coupled to the second cylinder of the engine, while receiving second feedback from the vibration sensor, perturbing the second cylinder during engine operation, and responsive to the second feedback indicating a second vibration level difference greater than or equal to the first threshold difference, setting a second indication of a second degradation condition of the second cylinder. In a second example of the method, optionally including the first example, the method further comprises: further responsive to the first feedback indicating the first vibration level difference greater than or equal to the first threshold difference: while receiving second feedback from the vibration sensor with the vibration sensor coupled to the first cylinder, perturbing a second cylinder of the engine during engine operation, the second cylinder different from the first cylinder, and responsive to the second feedback indicating a second vibration level difference greater than or equal to a second threshold difference, refining the first indication to indicate a second degradation condition of the first cylinder, wherein the second degradation condition corresponds to a greater confidence of degradation of the first cylinder and/or a greater severity of degradation of the first cylinder than the first degradation condition. In a third example of the method, optionally including one or both of the first and second examples, the vibration sensor is coupled a cylinder head of the first cylinder. In a fourth example of the method, optionally including one or more or each of the first through third examples, surfaces of the cylinder head are not altered, cleaned, or otherwise prepared for mounting of the vibration sensor. In a fifth example of the method, optionally including one or more or each of the first through fourth examples, the vibration sensor is not calibrated while coupled to the first cylinder. In a sixth example of the method, optionally including one or more or each of the first through fifth examples, perturbing the first cylinder comprises: actively perturbing the first cylinder by cutting out fuel to the first cylinder, and responsive to the active perturbation of the first cylinder, passively perturbing each second cylinder of a plurality of remaining cylinders of the engine by redistributing an engine load among the plurality of remaining cylinders, wherein the plurality of remaining cylinders includes all cylinders in the engine excepting the first cylinder. In a seventh example of the method, optionally including one or more or each of the first through sixth examples, operating the engine based on whether or not the first indication was set comprises, responsive to the first indication being set: altering one or more engine operating conditions based on the first indication, and operating the engine with the one or more altered engine operating conditions.

The disclosure also provides support for a method for an engine comprising a plurality of cylinders, the method comprising: for each target cylinder in the plurality of cylinders: mounting a first vibration sensor to the target cylinder, while monitoring a first vibration level of the target cylinder via the first vibration sensor, adjusting fueling to the target cylinder of the plurality of cylinders for a first duration less than a threshold duration, responsive to the first vibration level changing by greater than or equal to a first threshold magnitude, receiving a first indication of degradation of the target cylinder, and dismounting the first vibration sensor from the target cylinder following the fueling adjustment to the target cylinder. In a first example of the method, the method further comprises: maintaining one or more engine operating conditions during the fueling adjustment to the target cylinder, the one or more engine operating conditions comprising one or more of: an engine load and an engine speed. In a second example of the method, optionally including the first example, maintaining the one or more engine operating conditions comprises setting a high-load throttle level, the high-load throttle level including the engine load being maintained at greater than or equal to 50% of a maximum rated engine load. In a third example of the method, optionally including one or both of the first and second examples, adjusting fueling to the target cylinder comprises cutting out fueling to the target cylinder. In a fourth example of the method, optionally including one or more or each of the first through third examples, the method further comprises, following the fueling adjustment to the target cylinder, maintaining fueling to each of the plurality of cylinders for greater than the threshold duration. In a fifth example of the method, optionally including one or more or each of the first through fourth examples, the threshold duration is 3 min. In a sixth example of the method, optionally including one or more or each of the first through fifth examples, the plurality of cylinders is distributed among first and second cylinder banks, and wherein the method further comprises: for each target cylinder set of the plurality of cylinders: while monitoring a pre-turbine exhaust gas temperature for each of the first and second cylinder banks, adjusting fueling to the target cylinder set for a second duration not overlapping with the first duration, and responsive to the pre-turbine exhaust gas temperature of the first cylinder bank deviating from the pre-turbine exhaust gas temperature of the second cylinder bank by greater than or equal to a second threshold magnitude, receiving a second indication of degradation of at least one cylinder in the target cylinder set, and further responsive to the first vibration level changing by greater than or equal to the first threshold magnitude, determining a confidence level of degradation of the target cylinder based on whether the second indication was received or whether the target cylinder is included in the target cylinder set for which the second indication was received. In a seventh example of the method, optionally including one or more or each of the first through sixth examples, the method further comprises: while monitoring a second vibration level of a non-target cylinder via a second vibration sensor mounted to the non-target cylinder, the non-target cylinder different from the target cylinder, incrementing an engine speed up to a rated engine speed, responsive to the first vibration level deviating from the second vibration level by greater than or equal to a second threshold magnitude, receiving a second indication of degradation of the target cylinder, and further responsive to the first vibration level changing by greater than or equal to the first threshold magnitude, determining a confidence level of degradation of the target cylinder based on whether the second indication was received.

The disclosure also provides support for a vehicle system, comprising: an engine comprising a plurality of cylinders, the plurality of cylinders comprising a target cylinder, a fuel system fluidically coupled to each of the plurality of cylinders, a vibration sensor externally mounted to a cylinder head of the target cylinder and configured so as to maintain a structural integrity of each of the vibration sensor and the target cylinder upon removal of the vibration sensor from the cylinder head, and a controller communicably coupled to each of the fuel system and the vibration sensor, the controller executing instructions in non-transitory memory to: receive a first output from the vibration sensor prior to adjusting fueling to the target cylinder, the first output indicating a first vibration level, adjust fueling from the fuel system to the target cylinder, receive a second output from the vibration sensor following adjusting fueling from the fuel system to the target cylinder, the second output indicating a second vibration level, determine a difference between the first and second vibration levels, and responsive to the difference being greater than a threshold difference, indicate degradation of the target cylinder, and thereafter operating the engine without receiving further outputs from the vibration sensor. In a first example of the system, the fuel system comprises a plurality of valves respectively admitting fuel to the plurality of cylinders, wherein the controller is communicably coupled to each of the plurality of valves, and wherein adjusting fueling from the fuel system to the target cylinder comprises closing a valve of the plurality of valves which admits fuel to the target cylinder. In a second example of the system, optionally including the first example, the vibration sensor is externally mounted to the cylinder head of the target cylinder via magnetization, an adhesive, or one or more mechanical fasteners. In a third example of the system, optionally including one or both of the first and second examples, the vehicle system is a rail vehicle.

In another representation, a method for an engine includes:
  receiving first output from a vibration sensor coupled to a first cylinder of the engine while fueling the first cylinder and a second cylinder of the engine;
  receiving second output from the vibration sensor while cutting fuel to the first cylinder and fueling the second cylinder;
  receiving third output from the vibration sensor while cutting fuel to the second cylinder and fueling the first cylinder;
  responsive to a first difference between the first output and the second output being greater than or equal to a first threshold difference and a second difference between the first output and the third output being greater than or equal to a second threshold difference, setting a first indication of a first degradation condition of the first cylinder; and
  thereafter
  operating the engine based on whether or not the first indication was set.

As used herein, an element or step recited in the singular and preceded with the word "a" or "an" should be understood as not excluding plural of said elements or steps, unless such exclusion is explicitly stated. Furthermore, references to "one embodiment" or "one example" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for an engine, the method comprising:
  while receiving first feedback from a vibration sensor coupled to a first cylinder of the engine, perturbing the first cylinder during engine operation;
  responsive to the first feedback indicating a first vibration level difference greater than or equal to a first threshold difference, setting a first indication of a first degradation condition of the first cylinder; and
  thereafter
  operating the engine based on whether or not the first indication was set,
  wherein perturbing the first cylinder comprises:
  actively perturbing the first cylinder by cutting out fuel to the first cylinder; and
  responsive to the active perturbation of the first cylinder, passively perturbing each second cylinder of a plurality of remaining cylinders of the engine by redistributing an engine load among the plurality of remaining cylinders, wherein the plurality of remaining cylinders includes all cylinders in the engine excepting the first cylinder.

2. The method of claim 1, further comprising, for each second cylinder of the plurality of remaining cylinders of the engine, the plurality of remaining cylinders including all cylinders in the engine excepting the first cylinder:
  with the vibration sensor coupled to the second cylinder of the engine,
    while receiving second feedback from the vibration sensor, perturbing the second cylinder during engine operation; and
    responsive to the second feedback indicating a second vibration level difference greater than or equal to the first threshold difference, setting a second indication of a second degradation condition of the second cylinder.

3. The method of claim 1, further comprising:
  further responsive to the first feedback indicating the first vibration level difference greater than or equal to the first threshold difference:
    while receiving second feedback from the vibration sensor with the vibration sensor coupled to the first cylinder, perturbing a second cylinder of the engine during engine operation, the second cylinder different from the first cylinder; and
    responsive to the second feedback indicating a second vibration level difference greater than or equal to a second threshold difference, refining the first indication to indicate a second degradation condition of the first cylinder,
    wherein the second degradation condition corresponds to a greater confidence of degradation of the first cylinder and/or a greater severity of degradation of the first cylinder than the first degradation condition.

4. The method of claim 1, wherein the vibration sensor is coupled to a cylinder head of the first cylinder.

5. The method of claim 4, wherein surfaces of the cylinder head are not altered, cleaned, or otherwise prepared for mounting of the vibration sensor.

6. The method of claim 1, wherein the vibration sensor is not calibrated while coupled to the first cylinder.

7. The method of claim 1, wherein operating the engine based on whether or not the first indication was set comprises, responsive to the first indication being set:
  altering one or more engine operating conditions based on the first indication; and
  operating the engine with the one or more altered engine operating conditions.

8. A method for an engine comprising a plurality of cylinders, the method comprising:
  for each target cylinder in the plurality of cylinders:
    mounting a first vibration sensor to the target cylinder;
    while monitoring a first vibration level of the target cylinder via the first vibration sensor, adjusting fueling to the target cylinder of the plurality of cylinders for a first duration less than a threshold duration;
    responsive to the first vibration level changing by greater than or equal to a first threshold magnitude, generating a first indication for the target cylinder;
    dismounting the first vibration sensor from the target cylinder following the fueling adjustment to the target cylinder;
    while monitoring a pre-turbine exhaust gas temperature for each of a first cylinder bank and second cylinder bank, adjusting fueling to the target cylinder set for a second duration not overlapping with the first duration;
    responsive to the pre-turbine exhaust gas temperature of the first cylinder bank deviating from the pre-turbine exhaust gas temperature of the second cylinder bank by less than a second threshold magnitude, generating a second indication for fault of at least one cylinder in the target cylinder set; and
    further responsive to the first vibration level changing by greater than or equal to the first threshold magnitude, determining a confidence level for the first indication of the target cylinder based on whether the second indication was received or whether the target cylinder is included in the target cylinder set for which the second indication was received.

9. The method of claim 8, further comprising maintaining one or more engine operating conditions during the fueling adjustment to the target cylinder, the one or more engine operating conditions comprising one or more of:
  an engine load and an engine speed.

10. The method of claim 9, wherein maintaining the one or more engine operating conditions comprises setting a high-load throttle level, the high-load throttle level including the engine load being maintained at greater than or equal to 50% of a maximum rated engine load.

11. The method of claim 8, wherein adjusting fueling to the target cylinder comprises cutting out fueling to the target cylinder.

12. The method of claim 8, further comprising, following the fueling adjustment to the target cylinder, maintaining fueling to each of the plurality of cylinders for greater than the threshold duration.

13. The method of claim 8, wherein the threshold duration is 3 min.

14. The method of claim 8, further comprising:
  while monitoring a second vibration level of a non-target cylinder via a second vibration sensor mounted to the non-target cylinder, the non-target cylinder different from the target cylinder, incrementing an engine speed up to a rated engine speed;
  responsive to the first vibration level deviating from the second vibration level by greater than or equal to a second threshold magnitude, receiving a second indication of degradation of the target cylinder; and
  further responsive to the first vibration level changing by greater than or equal to the first threshold magnitude, determining a confidence level of degradation of the target cylinder based on whether the second indication was received.

15. A method for an engine comprising a plurality of cylinders, the method comprising:
  for each target cylinder set of the plurality of cylinders:
    while monitoring a pre-turbine exhaust gas temperature for each of a first cylinder bank and a second cylinder bank, reducing fueling to the target cylinder set;
    responsive to the pre-turbine exhaust gas temperature of the first cylinder bank deviating from the pre-turbine exhaust gas temperature of the second cylinder bank by greater than or equal to a threshold temperature, generating an indication for a healthy cylinder; and
    responsive to the pre-turbine exhaust gas temperature of the first cylinder bank deviating from the pre-turbine exhaust gas temperature of the second cylinder bank by less than the threshold temperature, generating an indication for a faulty cylinder.

16. The method of claim 15, further comprising:
  mounting a first vibration sensor to the target cylinder;
  while monitoring a first vibration level of the target cylinder via the first vibration sensor, adjusting fueling to the target cylinder of the plurality of cylinders for a first duration less than a threshold duration;

responsive to the first vibration level changing by greater than or equal to a first threshold magnitude, generating a second indication for the target cylinder; and dismounting the first vibration sensor from the target cylinder following the fueling adjustment to the target cylinder.

17. The method of claim 15, wherein the threshold temperature is 80° C.

18. The method of claim 15, wherein the fuel is reduced by half.

19. The method of claim 15, wherein the fuel is reduced completely such that fuel is not injected.

* * * * *